US009274723B2

(12) United States Patent
Watanabe et al.

(10) Patent No.: US 9,274,723 B2
(45) Date of Patent: Mar. 1, 2016

(54) STORAGE APPARATUS AND ITS CONTROL METHOD

(75) Inventors: Yasuo Watanabe, Machida (JP); Yoshinori Ohira, Kawasaki (JP); Kenta Shiga, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 1445 days.

(21) Appl. No.: 12/664,001

(22) PCT Filed: Oct. 13, 2009

(86) PCT No.: PCT/JP2009/005332
§ 371 (c)(1),
(2), (4) Date: Aug. 17, 2010

(87) PCT Pub. No.: WO2011/045831
PCT Pub. Date: Apr. 21, 2011

(65) Prior Publication Data
US 2011/0145528 A1 Jun. 16, 2011

(51) Int. Cl.
*G06F 12/02* (2006.01)
*G06F 3/06* (2006.01)
*G06F 11/14* (2006.01)
*G06F 11/10* (2006.01)

(52) U.S. Cl.
CPC ............ *G06F 3/0665* (2013.01); *G06F 3/0605* (2013.01); *G06F 3/067* (2013.01);
(Continued)

(58) Field of Classification Search
CPC . G06F 3/0685; G06F 3/06665; G06F 3/0665; G06F 11/1469; F06F 11/1469
See application file for complete search history.

(56) References Cited

U.S. PATENT DOCUMENTS

2005/0091455 A1 4/2005 Kano et al.
2005/0198099 A1* 9/2005 Motsinger et al. ............ 709/200
(Continued)

FOREIGN PATENT DOCUMENTS

EP   1 808 758 A2   7/2007
EP   1 814 033 A2   8/2007
(Continued)

OTHER PUBLICATIONS

PCT International Search Report on PCT International Application No. PCT/JP2009/005332 mailed Jun. 24, 2010; European Patent Office; 5 pages.

*Primary Examiner* — Charles Rones
*Assistant Examiner* — Ryan Dare
(74) *Attorney, Agent, or Firm* — Foley & Lardner LLP

(57) ABSTRACT

Proposed are a storage apparatus and its control method capable of restoring data of a virtual page to an appropriate device hierarchy according to its data value. This storage apparatus stores, in a backup-destination storage medium, data stored in the respective physical pages allocated with the virtual volume and management information of the virtual volume including information concerning the device hierarchy to which the respective physical pages belong according to a backup command of the virtual volume, and allocates a physical page of the same device hierarchy as the device hierarchy of the physical page that was allocated before the backup to each of the restoration-target virtual pages of the virtual volume, respectively, and writes corresponding data, which was read from the storage medium, into each of the allocated physical pages according to a restoration command of the virtual volume and based on the management information of the virtual volume stored in the storage medium.

8 Claims, 19 Drawing Sheets

(52) U.S. Cl.
CPC ........... *G06F 3/0647* (2013.01); *G06F 3/0685* (2013.01); *G06F 11/1076* (2013.01); *G06F 11/1456* (2013.01); *G06F 11/1469* (2013.01); *G06F 11/1008* (2013.01)

(56) References Cited

U.S. PATENT DOCUMENTS

| | | |
|---|---|---|
| 2006/0047930 A1 | 3/2006 | Takahashi et al. |
| 2008/0177809 A1 | 7/2008 | Murayama et al. |
| 2009/0043942 A1 | 2/2009 | Shiga |
| 2009/0070382 A1* | 3/2009 | Agrawal et al. ............... 707/200 |

FOREIGN PATENT DOCUMENTS

| | | |
|---|---|---|
| JP | 2003-015915 A | 1/2003 |
| JP | 2008-018127 A | 1/2008 |
| JP | 2008-047156 A | 2/2008 |
| JP | 2008-181271 | 7/2008 |
| JP | 2009-043055 A | 2/2009 |

* cited by examiner

FIG.6

| LU# | VVOL# |
|---|---|
| 1 | 1 |
| 2 | 2 |
| 3 | 3 |
| : | : |

| RAID GROUP # | RAID LEVEL | SIZE | MEMORY DEVICE TYPE | MEMORY DEVICE LIST |
|---|---|---|---|---|
| 1 | RAID5 | 1000GB | SSD | 1,2,3,4 |
| 2 | RAID5 | 1000GB | SAS HDD | 5,6,7,8 |
| 3 | RAID5 | 1000GB | SATA HDD | 9,10,11,12 |
| : | : | : | : | : |

| POOL # | RAID GROUP # | SIZE | UNUSED CAPACITY |
|---|---|---|---|
| 1 | 1 | 3000GB | 1200GB |
|  | 5 |  |  |
|  | 10 |  |  |
| 2 | 2 | 2000GB | 800GB |
|  | 16 |  |  |
| : | : | : | : |

| VVOL # | DEVICE HIERARCHY | CORRESPONDING POOL # | DEVICE HIERARCHY QUANTITY |
|---|---|---|---|
| 1 | Tier1 | 1 | 3 |
|  | Tier2 | 2 |  |
|  | Tier3 | 3 |  |
| 2 | Tier1 | 1 | 2 |
|  | Tier2 | 2 |  |
| : | : | : | : |

| RAID GROUP # | PHYSICAL PAGE # | LOGICAL ADDRESS | STATUS |
|---|---|---|---|
| 1 | 1 | 0~1023 | IN USE |
|   | 2 | 1024~2047 | IN USE |
|   | 3 | 2048~3071 | UNUSED |
|   | : | : | IN USE |
| 2 | 1 | 0~1023 | IN USE |
|   | 2 | 1024~2047 | IN USE |
|   | 3 | 2048~3071 | : |
|   | : | : | : |
| : | : | : |   |

| VVOL# | VIRTUAL PAGE # | STATUS | RAID GROUP # | PHYSICAL PAGE # | DEVICE HIERARCHY |
|---|---|---|---|---|---|
| 1 | 1 | ALLOCATED | 2 | 2 | Tier1 |
|  | 2 | ALLOCATED | 1 | 4 | Tier2 |
|  | 3 | UNALLOCATED | NULL | NULL | NULL |
|  | : | : | : | : | : |
| 2 | 1 | ALLOCATED | 1 | 3 | Tier1 |
|  | 2 | ALLOCATED | 2 | 5 | Tier1 |
|  | 3 | ALLOCATED | 1 | 10 | Tier1 |
|  | : | : | : | : | : |
| : | : | : | : | : | : |

| VVOL # | VIRTUAL PAGE # | ACCESS COUNTER |
|---|---|---|
| 1 | 1 | 17 |
|   | 2 | 5 |
|   | 3 | NULL |
|   | : | : |
| 2 | 1 | 4 |
|   | 2 | 0 |
|   | : | : |
| : | : | : |

| VVOL # | VIRTUAL PAGE # | TIME PERIOD | IOPS |
|---|---|---|---|
| 1 | 1 | : | : |
| | | 2009/01/01 10:00-<br>2009/01/01 10:05 | 4.2 |
| | | 2009/01/01 10:05-<br>2009/01/01 10:10 | 1.6 |
| | 2 | : | : |
| | : | : | : |
| 2 | : | : | : |
| : | : | : | : |
| 1701 | 1702 | 1703 | 1704 |

| VVOL # | VIRTUAL PAGE # | AVERAGE IOPS | PEAK IOPS | LAST ACCESS TIME |
|---|---|---|---|---|
| 1 | 1 | 108 | 178 | 2009/01/01 10:27:21 |
|   | 2 | 56 | 142 | 2009/01/01 10:27:10 |
|   | 3 | NULL | NULL | NULL |
|   | : | : | : | : |
| 2 | 1 | 28 | 105 | 2009/01/01 8:58:42 |
|   | 2 | 34 | 121 | 2009/01/01 9:36:36 |
|   | : | : | : | : |
| : | : | : | : | : |

| VVOL # | SCORE CALCULATION COEFFICIENT A | SCORE CALCULATION COEFFICIENT B | SCORE CALCULATION COEFFICIENT C | SCORE THRESHOLD LIST |
|---|---|---|---|---|
| 1 | 100.0 | 20.0 | −1.0 | {FIRST THRESHOLD = 2000, SECOND THRESHOLD = 1000} |
| 2 | 150.0 | 30.0 | −1.0 | {FIRST THRESHOLD = 1500} |
| 3 | NULL | NULL | NULL | NULL |
| : | : | : | : | : |

1901　1902　1903　1904　1905

1900

STORAGE APPARATUS AND ITS CONTROL METHOD

TECHNICAL FIELD

The present invention relates to a storage apparatus and its control method which, for instance, can be suitably applied to a storage apparatus that rearranges data stored in a virtual volume among device hierarchies according to an access pattern to such virtual volume.

BACKGROUND ART

A storage system is configured by comprising at least one or more storage apparatuses referred to, for example, as disk array subsystems. With this type of storage apparatus, disk drives such as hard disk drives and semiconductor memory drives are arranged in an array to provide storage areas that are operated in RAID (Redundant Array of Independent Inexpensive Disks) format. A host computer (this is hereinafter referred to as the "host") accesses the storage areas provided by the storage apparatus and thereby performs the reading and writing of data.

Incidentally, the amount of data that is being managed in organizations such as corporations, local governments, educational institutions, financial institutions and public offices is of an annually increasing trend, and storage apparatuses are being added or replaced pursuant to the increase in the amount of data. In light of the increase in the amount of data and the complication in the configuration of the storage system, PTL 1 discloses technology of arranging, in order to improve the utilization efficiency of the storage system, data to be used by various application programs such as email management software and database management software at an appropriate location according to the value of such data, defining a plurality of different device hierarchies in the storage apparatus, and rearranging the data in the storage apparatus among the device hierarchies (this is hereinafter referred to as "data migration" or "hierarchy control").

Meanwhile, although the storage capacity of a logical volume is generally fixed, PTL 2 discloses technology of automatically expanding the storage capacity of a virtual volume by allocating a partial page of a physical resource (this is hereinafter referred to as the "physical page") to that virtual volume according to an access request from a host computer in order to increase the utilization efficiency of the storage areas. In the ensuing explanation, a partial page in the virtual volume corresponding to the physical page is hereinafter referred to as a "virtual page."

The virtual volume is a hypothetical logical volume. The storage apparatus is able to show the host (more precisely, the application that is executed by that host) a virtual storage capacity (this is hereinafter referred to as the "virtual capacity") which is different from the total storage capacity (this is hereinafter referred to as the "real capacity") of one or more physical pages that are actually allocated to the virtual volume.

As a result of a physical page being allocated to a virtual volume, the real capacity of the virtual volume will be expanded in the amount of the storage capacity of that physical page. Thus, the virtual volume can also be referred to as a "capacity-expanded volume." In addition, since the virtual volume is also a logical volume that can be provided based on the Thin Provisioning technology, it can also be referred to as a "Thin Provisioning volume."

The logical volumes in a storage apparatus are sometimes backed up in order to prepare for data loss and the like caused by the malfunction of a disk drive. PTL 3 discloses technology of copying only a virtual page corresponding to a physical page that was allocated to a virtual volume to a tape in a tape library device upon backing up a virtual volume in a tape library device, and copying only the virtual page in the copied tape to a storage apparatus upon restoring data from the tape library device.

CITATION LIST

Patent Literature

[PTL 1] Japanese Unexamined Patent Publication No. 2008-047156
[PTL 2] Japanese Unexamined Patent Publication No. 2003-15915
[PTL 3] Japanese Unexamined Patent Publication No. 2008-181271

SUMMARY OF INVENTION

Technical Problem

Meanwhile, with the backup/restoration technology disclosed in PTL 3, if a device hierarchy is configured in the storage areas of the storage apparatus, during the restoration, it is not possible to acquire information regarding which device hierarchy the physical page allocated to the backed up virtual page belonged, and there is a problem in that the data of the virtual page cannot be restored to the appropriate device hierarchy according to its data value.

Here, a device hierarchy refers to a hierarchy that represents the characteristics of a storage area group referred to as a pool that provides the physical page, and various types of device hierarchies can be created based on the RAID level of the RAID group configuring the pool, the type of memory devices configuring that RAID group, the bit cost and so on.

The present invention was devised in view of the foregoing points. Thus, an object of the present invention is to propose a storage apparatus and its control method capable of restoring data of a virtual page to an appropriate device hierarchy according to its data value.

Solution to Problem

In order to achieve the foregoing object, the present invention provides a storage apparatus for providing a virtual volume to a host, allocating a storage area to the virtual volume in prescribed physical page units according to a data write request from the host for writing data into the virtual volume, and writing write-target data into the allocated physical page. This storage apparatus comprises an access pattern management unit for managing an access pattern from the host to the virtual volume for each virtual page of the virtual volume corresponding to the physical page, a hierarchy control processing unit for changing the physical page allocated with the virtual page to a physical page belonging to another device hierarchy for each of the virtual pages of the virtual volume based on the access pattern and as necessary, and migrating data stored in a pre-change physical page to a post-change physical page, a backup processing unit for storing, in a backup-destination storage medium, data stored in the respective physical pages allocated with the virtual volume and management information of the virtual volume including information concerning the device hierarchy to which the respective physical pages belong according to a backup command of the virtual volume, and a restoration processing unit for allocating a physical page of the same device hierarchy as the device hierarchy of the physical page that was allocated before the backup to each of the restoration-target virtual pages of the virtual volume, respectively, and writing corresponding data, which was read from the storage medium, into each of the allocated physical pages according to a restoration command of the virtual volume and based on the management information of the virtual volume stored in the storage medium.

The present invention additionally provides a method of controlling a storage apparatus for providing a virtual volume to a host, allocating a storage area to the virtual volume in prescribed physical page units according to a data write request from the host for writing data into the virtual volume, and writing write-target data into the allocated physical page. This method comprises a first step of managing an access pattern from the host to the virtual volume for each virtual page of the virtual volume corresponding to a physical page of the storage area, a second step of changing the physical page allocated with the virtual page to a physical page belonging to another device hierarchy for each of the virtual pages of the virtual volume based on the access pattern and as necessary, and migrating data stored in a pre-change physical page to a post-change physical page, a third step of storing, in a backup-destination storage medium, data stored in the respective physical pages allocated with the virtual volume and management information of the virtual volume including information concerning the device hierarchy to which the respective physical pages belong according to a backup command of the virtual volume, and a fourth step of allocating a physical page of the same device hierarchy as the device hierarchy of the physical page that was allocated before the backup to each of the restoration-target virtual pages of the virtual volume, respectively, and writing corresponding data, which was read from the storage medium, into each of the allocated physical pages according to a restoration command of the virtual volume and based on the management information of the virtual volume stored in the storage medium.

Advantageous Effects of Invention

According to the present invention, data of the backed up virtual volume can be restored to the appropriate device hierarchy, whereby it is possible to realize a storage apparatus and its control method capable of efficiently using the storage areas in the storage apparatus.

BRIEF DESCRIPTION OF DRAWINGS

FIG. 6 is a conceptual diagram showing the configuration example of an LU management table.
FIG. 7 is a conceptual diagram showing the configuration example of a RAID group management table.
FIG. 8 is a conceptual diagram showing the configuration example of a pool management table.
FIG. 9 is a conceptual diagram showing the configuration example of a device hierarchy management table.
FIG. 10 is a conceptual diagram showing the configuration example of a physical page management table.
FIG. 11 is a conceptual diagram showing the configuration example of a virtual page management table.
FIG. 12 is a conceptual diagram showing the configuration example of an access counter management table.
FIG. 13 is a conceptual diagram showing the configuration example of an access history management table.
FIG. 14 is a conceptual diagram showing the configuration example of an access pattern management table.
FIG. 15 is a conceptual diagram showing the configuration example of a hierarchy-deciding information management table.

REFERENCE SIGNS LIST

Figure 1:
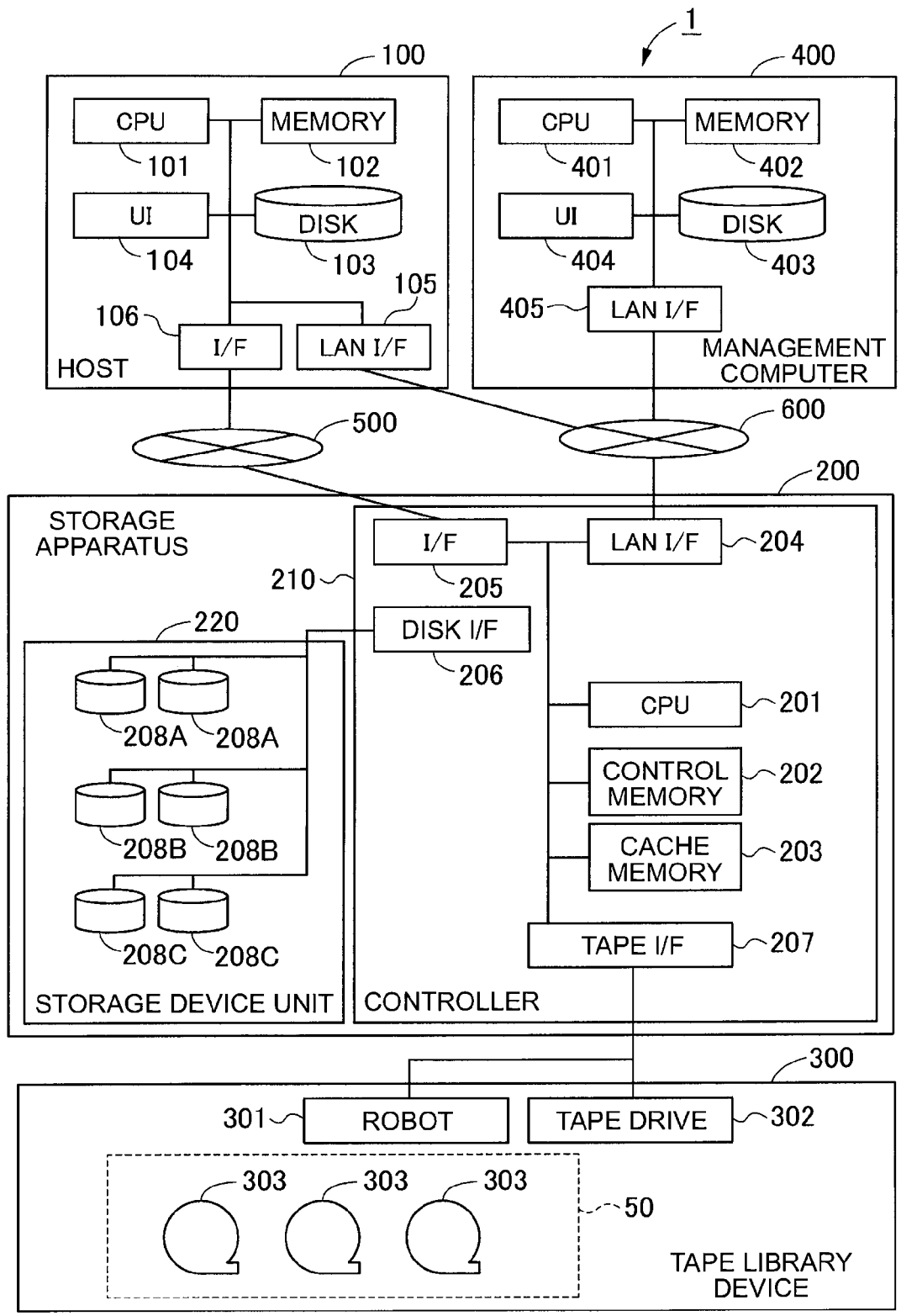
FIG. 1 is a block diagram showing the overall configuration of a computer system according to this embodiment.

20 Virtual volume
21 Virtual page
30 Pool
31 Physical page
40 RAID group
50 Tape group
60 Device hierarchy
100 Host
200 Storage apparatus
201 CPU
202 Control memory
203 Cache memory
207 Tape interface
208 Memory device
210 Controller
220 Storage device unit
300 Tape library device
301 Robot
302 Tape drive
303 Tape
1000 LU management table
1100 RAID group management table
1200 Pool management table
1300 Device hierarchy management table
1400 Physical page management table
1500 Virtual page management table
1600 Access counter management table
1700 Access history management table
1800 Access pattern management table
1900 Hierarchy decision information management table
2000 Tape group management table 2100 Read processing program
2200 Write processing program
2300 Access pattern update processing program
2400 Hierarchy control processing program
2500 Backup processing program
2600 Restoration processing program

DESCRIPTION OF EMBODIMENTS

An embodiment of the present invention is now explained in detail with reference to the attached drawings.

(1) Configuration of Computer System in Present Embodiment

FIG. 1 shows the overall computer system 1 according to the present embodiment. The computer system 1 comprises a host 100, a storage apparatus 200, a tape library device 300, and a management computer 400.

The host 100 and the storage apparatus 200 are mutually connected via a fibre channel 500, and are able to send and receive data, processing requests and the like through the fibre channel 500. The host 100, the storage apparatus 200 and the management computer 400 are mutually connected via a LAN (Local Area Network) 600, and are able to send and receive processing requests and the like through the LAN 600. The host 100 and the storage apparatus 200 may also be connected via a communication network such as a LAN instead of a fibre channel, or be connected via a dedicate line.

The host 100 is a computer system to be used by the user and is configured, for example, from a personal computer, a server, a mainframe or the like. The host 100 comprises a CPU (Central Processing Unit) 101, a memory 102, a disk device 103, a user interface 104, a LAN interface 105, and a communication interface 106.

Figure 4:
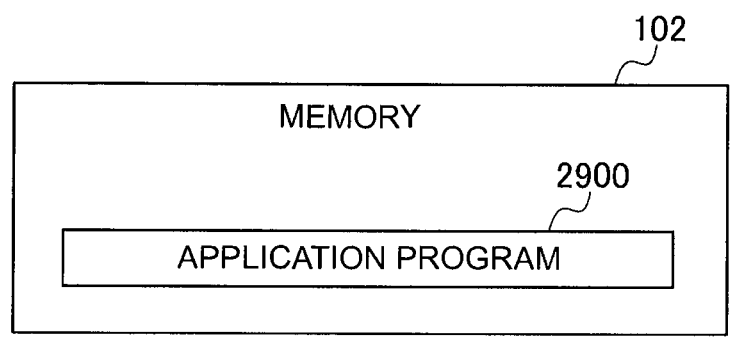
FIG. 4 is a conceptual diagram explaining the application program stored in the memory of the host.

The disk device 103 stores various programs such as driver software, and these programs are loaded into the memory 102 during the start-up of the host 100. The memory 102 is primarily used for storing programs that were loaded from the disk device 103. Among the programs that are loaded from the disk device 103 into the memory 102, included is an application program 2900 shown in FIG. 4 for performing the read/write access to the storage apparatus 200. The various programs stored in the memory 102 are loaded into and executed by the CPU 101.

The storage apparatus 200 comprises a storage device unit 220 that provides storage areas to the host 100 for reading and writing data, and a controller 210 for controlling the reading and writing of data from and into the storage device unit 220.

The storage device unit 220 comprises one or more types of memory devices 208 (208A, 208B, 208C, etc.). FIG. 1 shows a case where the storage device unit 220 is configured from three different types of memory devices; specifically, memory devices 208A, 208B and 208C. As the memory devices 208, used may be hard disk devices having an interface such as SAS (Serial Attached SCSI) or SATA (Serial ATA), or solid state drives (SSDs).

The controller 210 comprises a CPU 201, a control memory 202, a cache memory 203, a LAN interface 204, a communication interface 205, a disk interface 206, and a tape interface 207.

The CPU 201 is a processor that governs the operational control of the overall storage apparatus 200. The control memory 202 is used for storing various programs, and is also used as a work memory of the CPU 201. The various programs stored in the control memory 202 are loaded into and executed by the CPU 201. The cache memory 203 is used for temporarily storing data during the read/write access from the host 100.

The tape library device 300 comprises a robot 301, a tape drive 302, and a plurality of tapes (magnetic tape devices) 303. The robot 301 is an automatic changer of the tapes 303 which retrieves the necessary tape 303 from its storage location and loads it into the tape drive 302, and retrieves the tape 303 from the tape drive 302 and transports it to its storage location. The tape drive 302 is a recording/reproduction device of the tape 303, and reads and writes data from and into the loaded tape 303. The tape 303 is an example of a sequential access-type memory device for storing data in a magnetic tape area.

In the case of this embodiment, a tape group 50 is defined by a plurality of tapes 303. As a result of defining this kind of tape group 50, backup data of a capacity that is greater than the capacity of a single tape 303 can be managed with a single management unit.

The management computer 400 is a computer system that is configured, for example, from a personal computer, a server, a mainframe or the like, and comprises a CPU 401, a memory 402, a disk device 403, a user interface 404, and a LAN interface 405.

Figure 5:
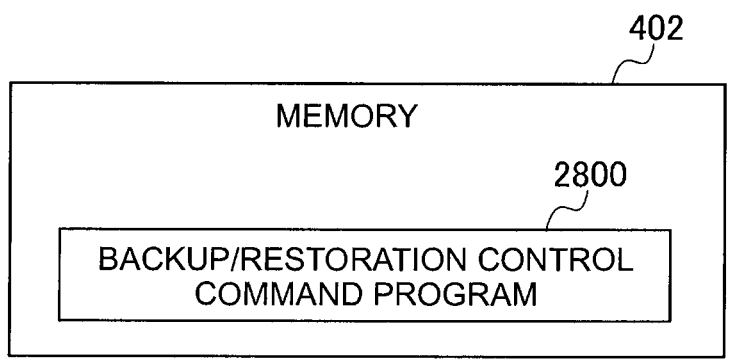
FIG. 5 is a conceptual diagram explaining the backup/restoration control command program stored in the memory of the management computer.

The disk device 403 stores various programs such as driver software, and these programs are loaded into the memory 402 during the start-up of the management computer 400. The memory 402 is primarily used for storing programs that were loaded from the disk device 403. Among the programs that are loaded from the disk device 403, included is a backup/restoration control command program 2800 shown in FIG. 5 for commanding the storage apparatus to back up the data stored in the virtual volume 20 of the storage apparatus 200 to the tape group 50 in the tape library device 300, or restoring the data of the virtual volume that was backed up to the tape group 50 in the tape library device 300 to the virtual volume 20 of the storage apparatus 200. The various programs stored in the memory 402 are loaded into and executed by the CPU 401.

Figure 2:
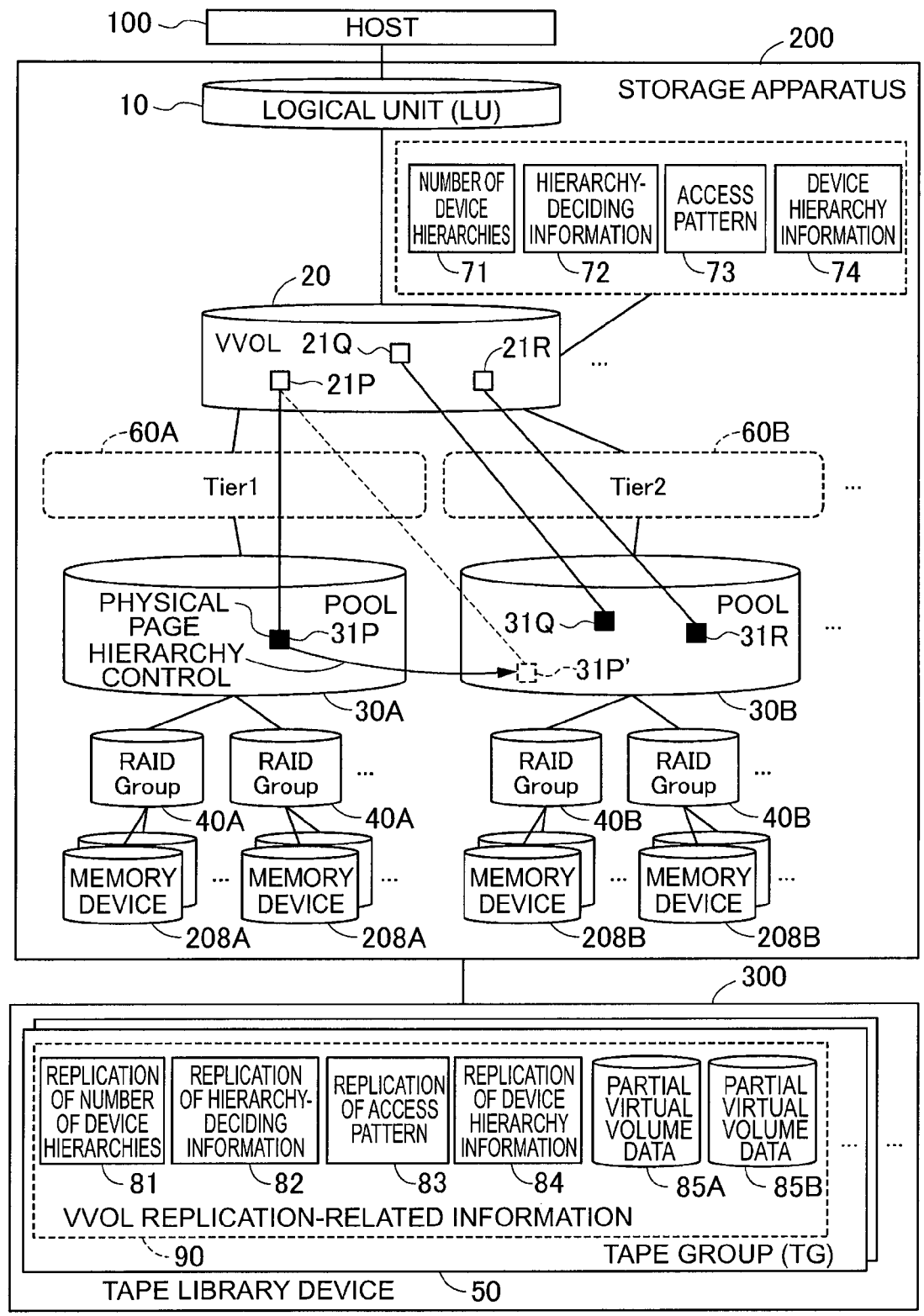
FIG. 2 is a conceptual diagram showing the logical configuration of a computer system according to this embodiment.

FIG. 2 shows the logical configuration of the present computer system. In the case of this embodiment, one RAID group 40 (40A, 40B, etc.) is configured from one or more memory devices 208 of the same type, and one pool 30 (30A, 30B, etc.) is configured from one or more RAID groups 40 of the same RAID level in the storage apparatus 200.

Each pool 30 is associated with a different device hierarchy 60 (60A, 60B, etc.). As described above, the device hierarchy 60 is a hierarchy representing the characteristics of the corresponding pool 30, and the device hierarchy 60 having various characteristics can be created based on the RAID level of the RAID group 40 configuring that pool 30, the type of the respective memory devices 208 configuring that RAID group 40, the bit cost and so on.

For example, in FIG. 2, as a result of applying the RAID group 40A having a RAID level of "RAID 1" with a higher performance than "RAID 5" as the respective RAID groups 40A configuring the pool 30A, and using an SSD (Solid State Drive) with a higher performance than a SATA hard disk device as the memory devices 208A configuring that RAID group 40A, the device hierarchy 60A of "Tier 1" associated with that pool 30A can be made to be a high performance device hierarchy, even though the bit cost will be high. Moreover, as a result of applying the RAID group 40B having a RAID level of "RAID 5" with a lower performance and bit cost than "RAID 1" as the respective RAID groups 40B configuring the pool 30B, and using a SATA hard disk device with a lower performance and bit cost than an SSD as the memory devices 208B configuring that RAID group 40B, the device hierarchy 60B of "Tier 2" associated with that pool 30B can be made to be a low cost device hierarchy, even though the performance will be low.

The device hierarchy 60 is associated with the virtual volume 20. In the foregoing case, one device hierarchy 60 (pool 30) can be shared by a plurality of virtual volumes 20. Thus, there are cases where a plurality of device hierarchies 60 are associated with one virtual volume 20. The number of device hierarchies 60 (device hierarchy quantity) to be associated with the respective virtual volumes 20 may differ. The number of device hierarchies is the same as the numerical value that is stored in the device hierarchy quantity column 1304 of the device hierarchy management table 1300 to be explained later with reference to FIG. 9.

The virtual volume 20 is an insubstantial logical volume as described above, and its substance (real storage area) exists in the memory device 208. The virtual volume 20 is associated with the logical unit 10 to be provided as the storage area for the storage apparatus 200 to read and write data from and into the host 100. The host 100 is thereby able to access the virtual volume 20 via the logical unit 10. Although FIG. 2 only shows one logical unit 10 and one virtual volume 20 for simplifying the explanation, a plurality of logical units 10 and/or virtual volumes 20 may be provided.

Here, the RAID group 40 may include a plurality of address ranges. In the ensuing explanation, one address range in the RAID group 40 is referred to as a physical page 31 (31P, 31Q, 31R, etc.). Although FIG. 2 shows a case where the physical page 31 is included in the pool 30 as a matter of convenience, the substance of the physical page 31 exists in the memory devices 208 configuring the RAID group 40. In FIG. 2, the pool 30A includes a physical page 31P, and its substance exists in the memory device 208A. In addition, in FIG. 2, the pool 30B includes physical pages 31Q, 31R, and their substance exists in the memory device 208B.

The virtual volume 20 may also include a plurality of address ranges. In the ensuing explanation, one address range in the virtual volume 20 is referred to as a virtual page 21 (21P, 21Q, 21R, etc.). For example, in FIG. 2, the virtual volume 20 includes virtual pages 21P to 21R.

Allocated to each of the plurality of virtual pages 21 in the virtual volume 20 is an unused physical page 31 among the physical pages 31 in the pool 30 associated with that virtual volume 20 via the device hierarchy 60 according to the read/write access with that virtual page 21 as the read destination or the write destination. For example, in FIG. 2, the physical page 31P is allocated to the virtual page 21P. Similarly, the physical pages 31Q, 31R are respectively allocated to the virtual pages 21Q, 21R. However, if the physical page 31 has been previously allocated to the virtual page 21, the foregoing allocation will not be performed.

Which physical page 31 of the pool 30 associated with which device hierarchy 60 is allocated to the respective virtual pages 21 is recorded in the device hierarchy information 74. The device hierarchy information 74 is the same information as the information included in the device hierarchy column 1506 of the virtual page management table 1500 described later with reference to FIG. 11.

(2) Hierarchy Control Processing in Present Computer System

The hierarchy control (this is hereinafter sometimes referred to as the "data migration control") in the computer system 1 is now explained. In the storage apparatus 200, data of a physical page (hereinafter referred to as the "old physical page" as appropriate) 31 in the pool 30 that is associated with a certain device hierarchy 60 can be migrated to a physical page (hereinafter referred to as the "new physical page" as appropriate) 31 in the pool 30 that is associated with a separate device hierarchy 60. Pursuant to this data migration, the association of the virtual page 21 and the physical page 31 is also changed. The old physical page 31 is released pursuant to the data migration, and will enter a status of being allocatable to another virtual page 21.

For example, in FIG. 2, data that is stored in the physical page 31P in the pool 30A that is associated with the device hierarchy 60A of "Tier 1" and allocated to the virtual page 21P of the virtual volume 20 is migrated to the physical page 31P' in the pool 30B that corresponds to the device hierarchy 60B of "Tier 2." Moreover, pursuant to the data migration, the association is changed so that the virtual page 21P and the physical page 31P' are associated.

The migration-destination device hierarchy 60 (pool 30) in the data migration is decided based on the hierarchy-deciding information 72 of the virtual volume 20, and the access pattern information 73 including information such as the access load and last access time of the corresponding virtual page 21. The hierarchy-deciding information 72 corresponds to the first to third score calculation coefficients respectively stored in the first to third score calculation coefficient columns 1902 to 1904, and the score threshold stored in the score threshold list column 1905 of that entry of the respective entries in the hierarchy-deciding information management table 1900 described later with reference to FIG. 15. The access pattern information 73 corresponds to the average IOPS stored in the average IOPS column 1803, the peak IOPS stored in the peak IOPS column 1803, and the last access time stored in the last access time column 1805 of the respective entries in the access pattern management table 1800 described later with reference to FIG. 14. Specific examples regarding the method of deciding the data migration-destination device hierarchy 60 (pool 30) will be described later.

One advantage in using hierarchy control is that the performance and bit cost of the overall system can be optimized. For example, the performance and bit cost of the overall system can be optimized by migrating data stored in a physical page 31 with lower access frequency among the physical pages 31 in the pool 30A with a high performance/bit cost to a physical page 31 in the pool 30B with a low performance/bit cost, and migrating data stored in a physical page 31 with a high access frequency among the physical pages 31 in the pool 30B with a low performance/bit cost to a physical page 31 in the pool 30A with a high performance/bit cost.

(3) Backup Processing and Restoration Processing in Present Embodiment

The case of backing up information of the virtual volume 20 to a tape is now explained. Data stored in the virtual volume 20 and management information related to that virtual volume 20 are backed up (copied) to the tape group 50 according to a user command. In the ensuing explanation, all information (data and related management information) related to a certain virtual volume 20 that was backed up is hereinafter referred to as "VVOL replication-related information 90." The tape group 50 includes the VVOL replication-related information 90 corresponding to a plurality of virtual volumes 20.

(a-1) Backup of Virtual Volume Data

Data to be backed up to the tape group 50 is only information related to a virtual page 21 allocated with a physical page 31 among the virtual pages 21 of the virtual volume 20. Backup of data to the tape group 50 is performed for each pool 30 (device hierarchy 60), and stores as partial virtual volume data 85 (85A, 85B, etc.) in the tape group 50.

For example, in FIG. 2, the partial virtual volume data 85A, 85B respectively correspond to the pool 30A (device hierarchy 60A) and the pool 30B (device hierarchy 60B), and data stored in the virtual page 21P previously allocated with the physical page 31P is stored in the corresponding tape group 50 as the partial virtual volume data 85A. Similarly, data stored in the virtual pages 21Q, 21R is stored in the corresponding tape group 50 as the partial virtual volume data 85B. As described above, as a result of backing up data for each pool 30, the possibility of being able to simultaneously access the areas in close proximity in the memory devices 208A, 208B will increase, whereby the improvement in the backup performance can be expected.

Information (information that is managed with the virtual page management table 1500 explained later with reference to FIG. 11) for managing which virtual page 21 is backed up to the tape group 50 is also copied to the tape group 50, and this information will be explained in detail later.

(a-2) Backup of Management Information Related to Virtual Volume

As management information related to the virtual volume 20, there are, for example, device hierarchy quantity information 71, hierarchy-deciding information 72, access pattern information 73, and device hierarchy information 74. There are other management information related to the virtual volume 20, and such other management information will be explained in detail later. During the backup, the device hierarchy quantity information 71, the hierarchy-deciding information 72, the access pattern information 73, and the device hierarchy information 74 are respectively stored in the tape group 50 as a replication 81 of the number of device hierarchies, a replication 82 of the hierarchy-deciding information, a replication 83 of the access pattern, and a replication 84 of the device hierarchy information in the tape group 50.

The restoration of the virtual volume 20 storing the VVOL replication-related information 90 to the tape 303 is now explained. With respect to the restoration of the virtual volume 20 based on the VVOL replication-related information 90, the virtual volume 20 can be restored to the backup-source storage apparatus 200, or the backed up tape 303 can be retrieved from the tape library device 300 and inserted into a tape library device 300 that is connected to a storage apparatus 200 that is different from the backup-source storage apparatus 200 so as to restore the virtual volume 20 to the storage apparatus 200 that is different from the backup-source storage apparatus 200.

In the ensuing explanation, the method of deciding the restoration-destination device hierarchy 60A (pool 30) of the respective virtual pages 21 is foremost explained, and the method of copying data from the virtual volume of the restoration source (hereinafter referred to as the "restoration-source virtual volume" as appropriate) 20 to the virtual volume of the restoration destination (hereinafter referred to as the "restoration-destination virtual volume" as appropriate) 20.

(b-1) Deciding Restoration-Destination Device Hierarchy (Pool)

In the restoration process, the partial virtual volume data 85 included in the VVOL replication-related information 90 of the restoration-source virtual volume 20 stored in the tape group 50 is restored (copied) to the restoration-destination virtual volume 20 in the storage apparatus 200.

In the restoration process, it is desirable that the physical page 31 corresponding to the virtual page 21 of the restoration-destination virtual volume 20 is appropriately allocated to the device hierarchy 60 (pool 30), and the performance and bit cost of the overall system can thereby be optimized as described above.

The method of deciding the restoration-destination device hierarchy 60 (pool 30) of the virtual page 21 in the partial virtual volume data 85 of the tape group 50 is now explained. In the ensuing explanation, the pair of the device hierarchy quantity information 71 and the hierarchy-deciding information 72 is referred to as a policy of the restoration-destination virtual volume 20, and the pair of the device hierarchy replication 81 and the hierarchy-deciding information replication 82 is referred to as a policy of the restoration-source virtual volume 20.

Upon deciding the device hierarchy 60, foremost, whether the policy of the restoration-source virtual volume 20 and the policy of the restoration-destination virtual volume 20 coincide is determined. If the foregoing policies coincide, the device hierarchy information recorded in the device hierarchy information replication 84 stored in the VVOL replication-related information 90 is used to decide the device hierarchy 60 (pool 30) to which the respective virtual pages 21 are to be allocated. Meanwhile, if the two policies do not coincide, the access pattern replication 83 stored in the VVOL replication-related information 90 and the hierarchy-deciding information 72 are used to decide the device hierarchy 60 to which the respective virtual pages 21 are to be allocated. For example, if the number of device hierarchies 60 that were being used by the restoration-source virtual volume 20 and the number of device hierarchies 60 that are being used by the restoration-destination virtual volume 20 are different, and the policies will not coincide. Specific examples regarding the method of deciding the device hierarchy 60 will be explained later.

(b-2) Copying from Restoration-Source Virtual Volume to Restoration-Destination Virtual Volume The copying of information related to the restoration-source virtual volume 20 from the restoration-source virtual volume 20 to the restoration-destination virtual volume 20 is performed for each partial virtual volume data 84. Since the partial virtual volume data 85 corresponds to the device hierarchy 60 (pool 30), all data of a certain partial virtual volume data 85 will be copied to one pool 30. Specifically, the copying from the restoration-source virtual volume 20 to the restoration-destination virtual volume 20 is performed for each pool 30. As a result of performing restoration for each pool 30, the possibility of being able to simultaneously access the areas in close proximity in the memory devices 208 will increase, whereby the improvement in the restoration performance can be expected.

Figure 3:
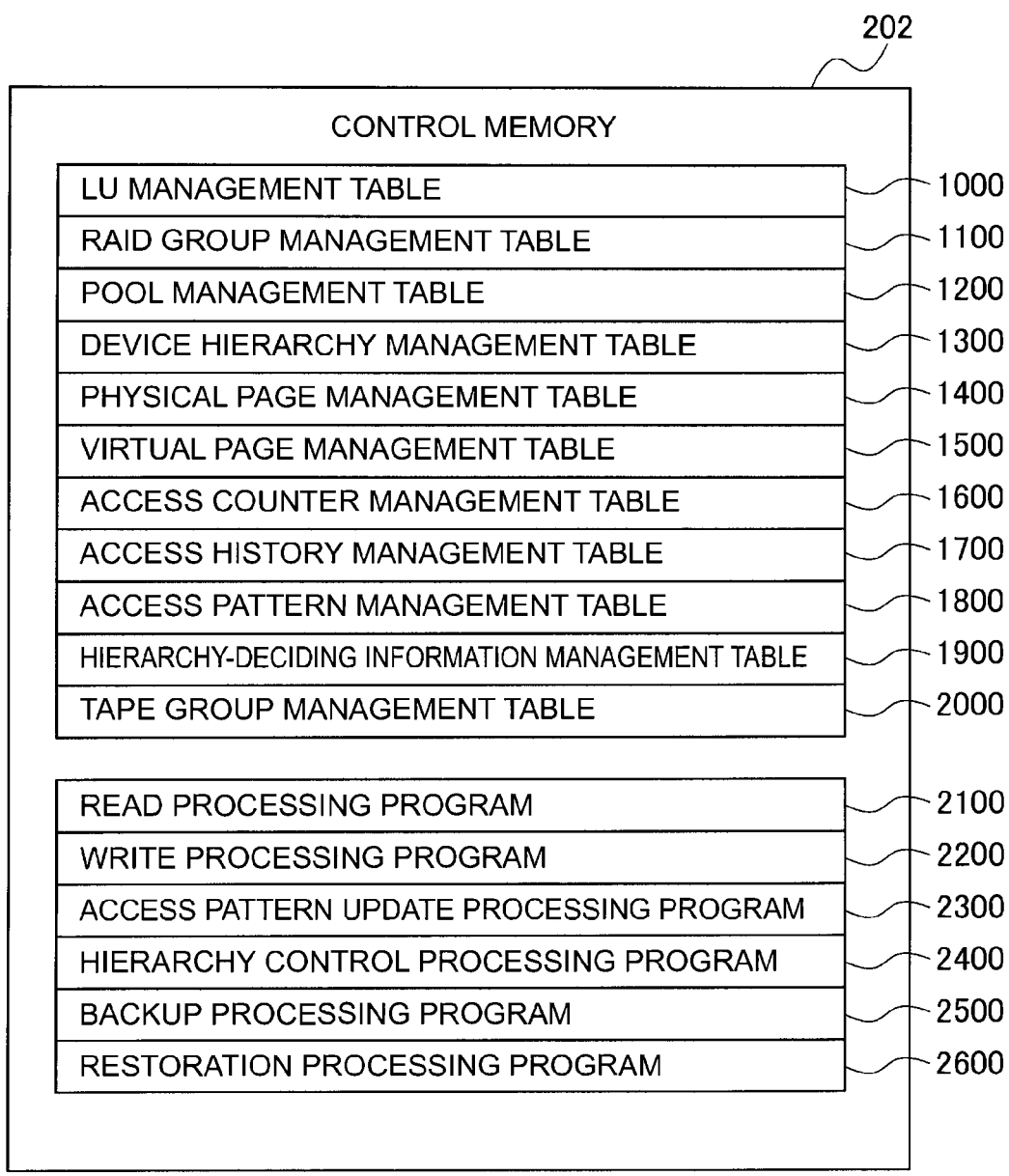
FIG. 3 is a conceptual diagram explaining the various tables and various programs stored in the control memory of the controller of the storage apparatus.

(4) Configuration of Various Table and Processing Contents of Various Programs (4-1) Configuration of Various Tables As means for executing the hierarchy control processing, the backup processing and the restoration processing based on the present embodiment described above, the control memory 202 (FIG. 1) of the storage apparatus 200 stores, as shown in FIG. 3, various tables such as an LU management table 1000, a RAID group management table 1100, a pool management table 1200, a device hierarchy management table 1300, a physical page management table 1400, a virtual page management table 1500, an access counter management table 1600, an access history management table 1700, an access pattern management table 1800, a hierarchy-deciding information management table 1900, and a tape group management table 2000, and various programs such as a read processing program 2100, a write processing program 2200, an access pattern update processing program 2300, a hierarchy control processing program 2400, a backup processing program 2500, and a restoration processing program 2600.

Among the above, the LU management table 1000 is a table for managing the correspondence of the logical unit 10 and the virtual volume 20 explained with reference to FIG. 2 and is configured, as shown in FIG. 6, from an LU number column 1001 and a virtual volume number column 1002.

The LU number column 1001 stores the identification number (this is hereinafter referred to as the "LU number") assigned to the logical unit 10, and the virtual volume number column 1002 stores the volume number of the virtual volume 20 associated with that logical unit 10. Accordingly, the case of the example illustrated in FIG. 6 shows that, for instance, a virtual volume 20 having a volume number of "1" is associated with a logical unit 10 having an LU number of "1."

The RAID group management table 1100 is a table for managing the respective RAID groups 40 (FIG. 2) defined in the storage apparatus 200 and is configured, as shown in FIG. 7, from a RAID group number column 1101, a RAID level column 1102, a size column 1103, a memory device type column 1104, and a memory device list column 1105.

The RAID group number column 1101 stores the identification number (this is hereinafter referred to as the "RAID group number") assigned to the corresponding RAID group 40, and the RAID size column 1103 stores the RAID level of that RAID group 40. As the RAID level, there are "RAID 1," "RAID 5," "RAID 0" and so on.

The size column 1103 stores the available capacity in that RAID group 40, and the memory device type column 1104 stores the type of the respective memory devices 208 configuring that RAID group 40. Incidentally, this capacity does not include the capacity of storage areas for storing redundant information in RAID technology. The memory device list column 1105 stores the identification number (this is hereinafter referred to as the "memory device number") assigned to each of the memory devices 208 configuring that RAID group 40.

Accordingly, the case of the example illustrated in FIG. 7 shows that the RAID groups 40A, 40B having a RAID group number of "1" are respectively configured from four memory devices 208 in which the type is "SSD" and their memory device numbers are respectively "1," "2," "3" and "4," the available capacity is "100 GB," and the RAID level is set to "RAID 5."

The pool management table 1200 is a table for managing the pools 20A, 20B defined in the storage apparatus 200 and is configured, as shown in FIG. 8, from a pool number column 1201, a RAID group number column 1202, a size column 1203, and an unused capacity column 1204.

The pool number column 1201 stores the identification number (this is hereinafter referred to as the "pool number") assigned to the pool 30 corresponding to that entry (row) in the pool management table 1200, and the RAID group number column 1202 stores the RAID group number of all RAID groups 40 configuring that pool 30. The size column 1203 stores the total value of the capacity of all RAID groups 40 configuring that pool 30, and the unused capacity column 1204 stores the total capacity of the physical page 31 that is not used (that is, not allocated to any virtual page 21) among all physical pages 31 included in that pool 30.

Accordingly, the case of the example illustrated in FIG. 8 shows that the pool 30 having a pool number of "1" is configured from three RAID groups 40 respectively having the RAID group numbers of "1," "5" and "10," the total capacity is "3000 GB," and the unused capacity is "1200 GB."

The device hierarchy management table 1300 is a table for managing the device hierarchy 60 (FIG. 2) to be used by the respective virtual volumes 20 and is configured, as shown in FIG. 9, from a virtual volume number column 1301, a device hierarchy column 1302, a corresponding pool number column 1303, and a device hierarchy quantity column 1304.

The virtual volume number column 1301 stores the volume number of the virtual volume 20 (FIG. 2) corresponding to that entry, and the device hierarchy column 1302 stores the identifier of the respective device hierarchies to be used by that virtual volume 20. In the case of this embodiment, the identifier of the respective device hierarchies take on a form of adding the device hierarchy number of the device hierarchy 60 to the character string "Tier." Specifically, the first hierarchy of the device hierarchy 60 is "Tier 1," second hierarchy is "Tier 2," etc, No. N hierarchy is "Tier N," and so on.

The corresponding pool number column 1303 stores the pool number of the pool 30 of the corresponding device hierarchy 60 to be used by that virtual volume 20, and the device hierarchy quantity column 1304 stores the number of device hierarchies 60 to be used by the corresponding virtual volume 20. Incidentally, the corresponding pool number column 1303 and the device hierarchy quantity column 1304 store user input values based on a device hierarchy setting program (not shown) stored in the memory 402 (FIG. 1) of the management computer 400 (FIG. 1).

Accordingly, the case of the example illustrated in FIG. 9 shows that the virtual volume 20 having a volume number of "1" is using three device hierarchies 60 of "Tier 1" to "Tier 3," and the pools 30 having the pool numbers of "1" to "3" respectively correspond to these three device hierarchies.

The physical page management table 1400 is a table for managing the physical pages 31 in the respective RAID groups 40 and is configured, as shown in FIG. 10, a RAID group number column 1401, a physical page number column 1402, a logical address column 1403, and a status column 1404.

The RAID group number column 1401 stores the RAID group number of the corresponding RAID group 40, and the physical page number column 1402 stores the identification number (this is hereinafter referred to as the "physical page number") assigned to the respective physical pages 31 in that RAID group 40. The physical page number is assigned individually in the RAID group 40. Accordingly, physical pages 31 with the same physical page number could respectively exist in different RAID group 40s.

The logical address column 1403 stores the logical address range of the corresponding physical page 31 in the corresponding RAID group 40. Specifically, logical address column 1403 stores the start address and the end address of that logical address range. For example, if the block size 512 bytes, since the logical address of "1024" shows a position where 512 bytes multiplied by 1024 bytes (=524288) were advanced from the top of that RAID group 40, the logical address range of "0 to 1023" shows data from 0 byte to the 514287 byte.

The status column 1404 stores the status of use of the corresponding physical page. As the status of use, the value of "in use" or "unused" is taken. The term "in use" shows that the physical page 31 is associated with a certain virtual page 21 (that is, it is being used), and the term "unused" shows that the physical page 31 is not associated with any virtual page 21 (that is, it is not being used).

Accordingly, the case of the example illustrated in FIG. 10 shows that the logical address range of the physical page 31 having a physical page number of "1" of the RAID group 40 having a RAID group number of "1" is "0 to 1023," and that the physical page 31 is currently associated with a virtual page 21 of any one of the virtual volumes 20.

Meanwhile, the virtual page management table 1500 is a table for managing the virtual volume 20 and is configured, as shown in FIG. 11, from a virtual volume number column 1501, a virtual page number column 1502, a status column 1503, a RAID group number column 1504, a physical page number column 1505, and a device hierarchy column 1506.

The virtual volume number column 1501 stores the volume number of the corresponding virtual volume 20, and the virtual page number column 1502 stores the virtual page number of all virtual pages 21 in that virtual volume 20.

The status column 1503 stores the allocation status of the corresponding virtual page 21 to the physical page 31. As this status, the value of "allocated" or "unallocated" is taken. The term "allocated" shows that a physical page 31 is allocated to that virtual page 21, and the term "unallocated" shows that a physical page 31 is not allocated to that virtual page 21.

The RAID group number column 1504 stores the RAID group number of the RAID group 40 to which the physical page 31 allocated to the corresponding virtual page 21 belongs. If no physical page 31 is associated with that virtual page 21, the RAID group number column 1504 will store an undefined value of "NULL."

The physical page number column 1505 stores the physical page number of the physical page 31 allocated to the corresponding virtual page 21, and the device hierarchy column 1506 stores the device hierarchies 60A, 60B to which the physical page 31 allocated to the corresponding virtual page 21 belongs. If a physical page 31 is still not allocated to that virtual page 21, the physical page number column 1505 and the device hierarchy column 1506 will respectively store an undefined value of "NULL."

Accordingly, the case of the example illustrated in FIG. 11 shows that a physical page 31 having a physical page number of "2" belonging to the RAID group 40 having a RAID group number of "2" has already been allocated ("allocated") to the virtual page 21 having a virtual page number of "1" in the virtual volume 20 having a volume number of "1," and the device hierarchy 60 of that physical page 31 is "Tier 1."

The access counter management table 1600 is a table for managing the access status to the respective virtual pages 21 in the respective virtual volumes 20 and is configured, as shown in FIG. 12, from a virtual volume number column 1601, a virtual page number column 1602, and an access counter column 1603.

The virtual volume number column 1601 stores the volume number of the corresponding virtual volume 20, and the virtual page number column 1602 stores the virtual page number of the respective virtual pages 21 existing in that virtual volume 20.

The access counter column 1603 stores the read/write access count to the corresponding virtual page 21. Since the value to be stored in the access counter column 1603 is periodically reset by the access pattern update processing program 2300 (FIG. 3) described later, the count will represented the count after the reset operation. If a physical page 31 is unallocated to the virtual page 21, the access counter column 1603 will store an undefined value of "NULL."

Accordingly, the case of the example illustrated in FIG. 12 shows that the virtual page 21 having a virtual page number of "1" in the virtual volume 20 having a volume number of "1" has already been accessed "17" times after the previous reset operation The access history management table 1700 is a table for managing the information showing the access load (unit is IOPS representing the read/write access count per second) to the virtual page 21 in the virtual volume 20 in a certain time period and is configured, as shown in FIG. 13, from a virtual volume number column 1701, a virtual page number column 1702, a time period column 1703, and an IOPS column 1704.

The virtual volume number column 1701 stores the volume number of the corresponding virtual volume 20, and the virtual page number column 1702 stores the virtual page number of the respective virtual pages 21 in that virtual volume 20.

The time period column 1703 stores the time period in which the access load of that virtual page 21 was measured. This time period includes the start time and the end time. The IOPS column 1704 stores the access load (unit is IOPS) to that virtual page that was measured in that time period. Since the values to be stored in the time period column 1703 and the TOPS column 1704 are additionally recorded periodically, the access history management table 1700 records the access load in a time series. Among the value stored in the time period column 1703 and the IOPS column 1704, values that have lapsed a given period of time (one week for instance) will be erased.

Accordingly, the case of the example illustrated in FIG. 13 shows that, with the virtual page 21 having a virtual page number of "1" in the virtual volume 20 having a volume number of "1," the access load during the time period of "2009/01/01 10:00 to 2009/01/01 10:05" was "4.2," and the access load during the time period of "2009/01/01 10:05 to 2009/01/01 10:10" was "1.6."

The access pattern management table 1800 is a table for managing the access pattern to the respective virtual pages 21 in the respective virtual volumes 20 and is configured, as shown in FIG. 14, from a virtual volume number column 1801, a virtual page number column 1802, an average IOPS column 1803, a peak IOPS column 1804, and a last access time column 1805.

The virtual volume number column 1801 stores the volume number of the corresponding virtual volume 20, and the virtual page number column 1802 stores the virtual page number of the respective virtual pages 21 in that virtual volume 20.

The average TOPS column 1803 stores the average value of the IOPS (read/write access count per second) during a prescribed period (in one day for example) of the corresponding virtual page 21. This average value is obtained by averaging the IOPS stored in the corresponding IOPS column 1704 (FIG. 13) of the access history management table 1700 (FIG. 13) during the foregoing prescribed period. If a physical page 31 is unallocated to that virtual page 21, the average IOPS column 1803 will store an undefined value of "NULL."

The peak IOPS column 1804 stores the maximum value of the TOPS during a prescribed period (in one day for example) of that virtual page 21. The maximum value is obtained by extracting the maximum value of the IOPS stored in the corresponding IOPS column 1704 of the access history management table 1700 during the foregoing prescribed period. If a physical page 31 is unallocated to that virtual page 21, the peak IOPS column 1804 will store an undefined value of "NULL."

The last access time column 1805 stores the time that the read/write access was last made to the corresponding virtual page 21. If a physical page 31 is unallocated to that virtual page 21, the last access time column 1805 will store an undefined value of "NULL."

Accordingly, the case of the example illustrated in FIG. 14 shows that, with the virtual page 21 having a virtual page number of "1" in the virtual volume 20 having a volume number of "1," the average TOPS is "108" and the peak IOPS is "178," and the last access time to that virtual page 21 was "2009/01/01 10:27:21."

Although this embodiment illustrated an example where the average IOPS stored in the average IOPS column 1803 and the peak IOPS stored in the peak IOPS column 1804 are acquired as the IOPS combining the read access and write access, the average IOPS and the peak IOPS may be separately acquired for the read access and the write access, respectively.

The hierarchy-deciding information management table 1900 is a table for managing the first to third score calculation coefficients and the score threshold to be used upon deciding the device hierarchy 60 (pool 30) to which data of the physical page 31 allocated to the virtual page 21 should be migrated and is configured, as shown in FIG. 15, from a virtual volume number column 1901, first to third score calculation coefficient columns 1902 to 1904, and a score threshold list column 1905.

The virtual volume number column 1901 stores the volume number of the corresponding virtual volume 20, and the first to third score calculation coefficient columns 1902 to 1904 respectively store the first to third score calculation coefficients to be used upon calculating the scores (described later) regarding the respective virtual pages 21 of the respective virtual volumes 20.

The score threshold list column 1905 stores a list of the score thresholds to be used upon deciding the device hierarchy 60 based on the score that was calculated regarding the virtual page 21 of that virtual volume 20. If a plurality of score thresholds are to be retained, the score threshold list column 1905 sets the score thresholds so that they are arranged in order so that the earlier thresholds take on a larger value (that is, first threshold>second threshold> etc.). The specific routine for deciding the device hierarchy using the first to third score calculation coefficients and the score threshold will be described later.

Accordingly, the case of the example illustrated in FIG. 15 shows that the values of the first to third score calculation coefficients of the virtual volume 20 having a volume number of "1" are respectively "100.0," "20.0" and "−1.0," and two score thresholds of "2000" and "1000" are set for that virtual volume 20.

If there is only one device hierarchy in relation to the corresponding virtual volume 20, since it is not necessary to decide the device hierarchy using the score threshold as described later, the first to third score calculation coefficient columns 1902 to 1904 and the score threshold list column 1905 will respectively store an undefined value of "NULL."

The first to third score calculation coefficient columns 1902 to 1904 and the score threshold list column 1905 in the hierarchy-deciding information management table 1900 are set with user input values based on a hierarchy-deciding information setting program (not shown) in the memory 402 (FIG. 1) of the management computer 400.

Figure 16:
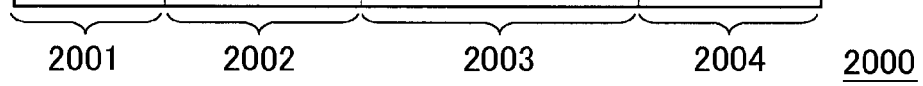
FIG. 16 is a conceptual diagram showing the configuration example of a tape group management table.

Meanwhile, the tape group management table 2000 is a table for managing the tape group 50 and is configured, as shown in FIG. 16, from a tape group number column 2001, a tape number column 2002, a stored virtual volume number column 2003, and a capacity column 2004.

The tape group number column 2001 stores the identification number (this is hereinafter referred to as the "tape group number") assigned to the corresponding tape group 50, and the tape number column 2002 stores the identification number (this is hereinafter referred to as the "tape number") of the respective tapes 303 configuring that tape group 50. If a corresponding tape group 50 is not defined, the tape number column 2002 will store an undefined value of "NULL."

The stored virtual volume number column 2003 stores the volume number of all virtual volumes 20 in which the storage area provided by that tape group 50 is set as the backup destination, and the capacity column 2004 stores the capacity that is actually being used upon storing those virtual volumes 20 in that tape group 50. The value stored in the capacity column 2004 will be the total capacity of the virtual pages 21 to which a physical page 31 has already been allocated among the virtual pages 21 configuring the virtual volume 20. If a corresponding tape group 50 is not defined, the stored virtual volume number column 2003 and the capacity column 2004 will also respectively store an undefined value of "NULL."

Accordingly, the case of the example illustrated in FIG. 16 shows that the tape group 50 having a tape group number of "1" is configured from two tapes 303 respectively having the tape numbers of "1" and "2," the tape 303 having a tape number of "1" stores the backup data of the virtual volumes 20 respectively having the volume numbers of "1" and "2," and the capacities of such backup data are respectively "500 GB" and "400 GB."

(4-2) Processing Contents of Various Programs

The specific processing contents of various types of processing to be executed based on the respective programs stored in the control memory 202 of the storage apparatus 200 are now explained. Although the ensuing explanation refers to the various processing subjects as "programs," in reality, it goes without saying that the CPU 201 of the controller 210 executes the corresponding processing based on such programs.

(4-2-1) Processing of Read Processing Program

Figure 17:
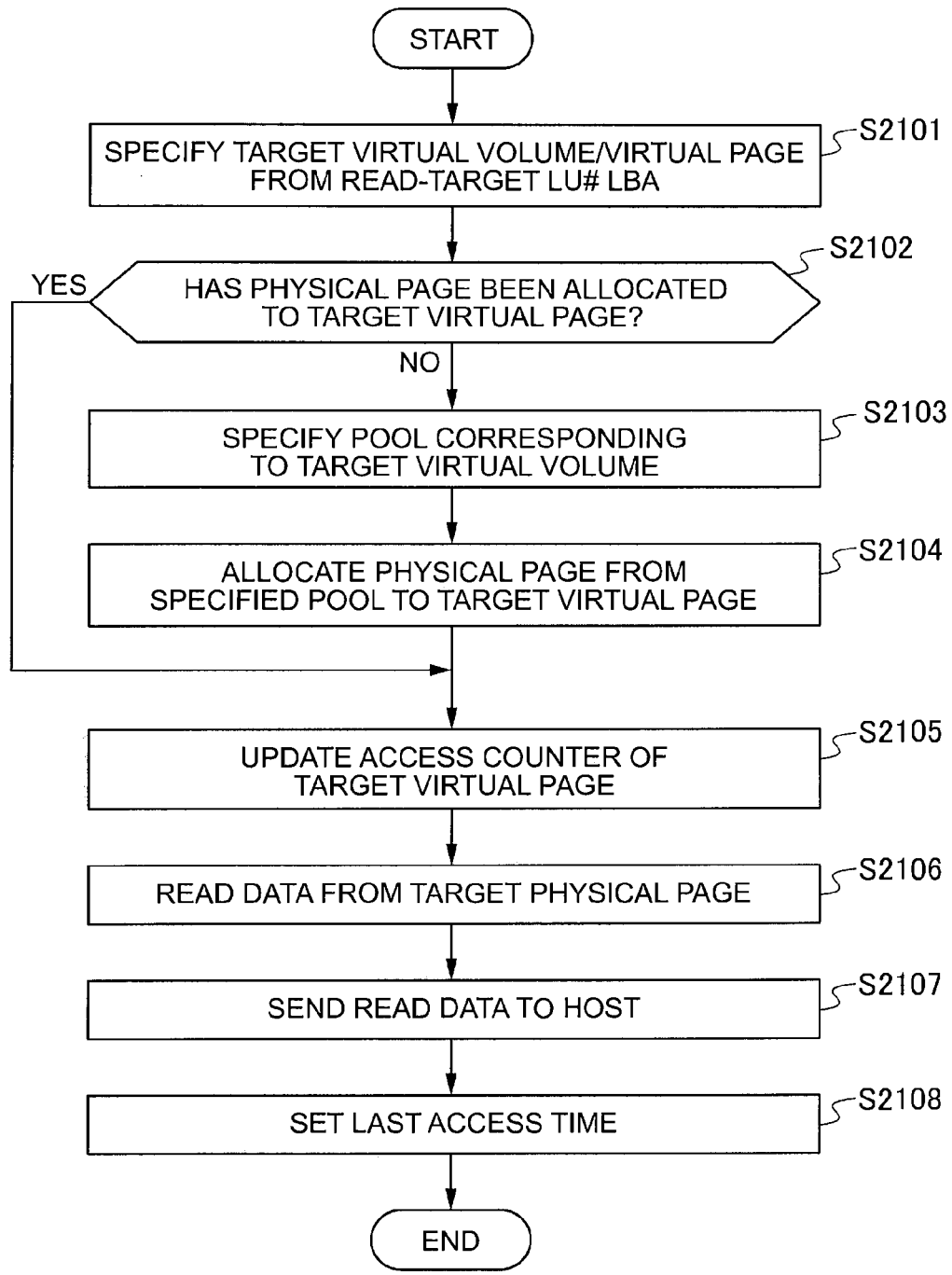
FIG. 17 is a flowchart showing the processing routine of read processing.

FIG. 17 shows the processing routine of the read processing to be executed by the read processing program 2100 (FIG. 3). The read processing program 2100 reads the read-target data from the memory device 208 and sends it to the host 100 according to this read processing routine.

Specifically, the read processing program 2100 starts the read processing when it receives a read command from the host 100, and foremost specifies the identification number (this is hereinafter referred to as the "logical unit number") of the logical unit 10 (FIG. 1) stored in the read-target data (this is hereinafter referred to as the "read-target data") designated in the read command, the volume number of the virtual volume (this is hereinafter referred to as the "read-target virtual volume") 20 storing that data based on the block address of the area storing that data, and the virtual page number of the virtual page (this is hereinafter referred to as the "read-target virtual page") 21 storing the read-target data in that read-target virtual volume 20 (S2101).

The volume number of the read-target virtual volume 20 is specified by referring to the LU management table 1000 (FIG. 6). The number of the read-target virtual page 21 is specified based on the size of the virtual page 21. For example, if the size of the virtual page 21 is 1024 blocks, this will be the virtual page 21 with a virtual page number of "1" when the block address designated in the read command is in the range of "0" to "1023," the virtual page 21 having a virtual page number of "2" when the block address is in the range of "1023" to "2047," the virtual page 21 having a virtual page number of "3" when the block address is in the range of "2048" to "3071," etc. and so on.

Subsequently, the read processing program 2100 refers to the status column 1503 (FIG. 11) of the read-target virtual page 21 in the virtual page management table 1500 (FIG. 11), and determines whether a physical page 31 is allocated to that read-target virtual page 21 (S2102). If the read processing program 2100 obtains a positive result in the foregoing determination, it proceeds to step S2105.

Meanwhile, if the read processing program 2100 obtains a negative result in the foregoing determination, it refers to the device hierarchy management table 1300 (FIG. 9), and specifies the pool 30 to be associated with the read-target virtual volume 21 according to the allocation policy of the physical page 31 (policy of designating from which pool 30 the physical page 31 is to be allocated; this is hereinafter referred to as the "physical page allocation policy") that is separately designated by the user (S2103). Specifically, for example, if the physical page allocation policy designates to allocate the physical pages 31 in order from the highest device hierarchy 60 (pool 30), the read processing program 2100 selects the pool 30 corresponding to "Tier 1" as the highest hierarchy of the device hierarchy 60.

Subsequently, the read processing program 2100 allocates a physical page 31 from the pool 30 specified at step S2103 to the read-target virtual page 21 (S2104).

Here, the processing to be executed by the read processing program 2100 in this step is separated into the processing of allocating the physical page 31 (this is hereinafter referred to as the "physical page allocation processing") and the processing associating that physical page 31 with the read-target virtual page 21 (this is hereinafter referred to as the "physical page association processing").

In the physical page allocation processing, the read processing program 2100 foremost refers to the pool management table 1200 (FIG. 8), and specifies the one or more RAID groups 40 included in the pool 30 specified at step S2103. Subsequently, the read processing program 2100 refers to the physical page management table 1400 (FIG. 10) and selects one physical page 31 having a status of "unused" among the physical pages 31 included in the one or more RAID groups 40. Incidentally, a table (not shown) for managing the unused physical pages 31 for each pool 30 may also be retained in the control memory 202 so that the physical page 31 can be selected from that table. Thereafter, the read processing program 2100 changes the status of the selected physical page 31 to "in use" in the physical page management table 1400. If there is not even a single physical page 31 having a status of "unused" in the pool 30 specified at step S2103 in this physical page allocation processing, the read processing program 2100 sends an error reply to the host 100.

Meanwhile, in the physical page association processing, the read processing program 2100 foremost changes the value of the status column 1503 of the read-target virtual page 21 in the virtual page management table 1500 (FIG. 11) to "allocated." Subsequently, the read processing program 2100 respectively sets, in the RAID group number column 1504 and the physical page number column 1505, the RAID group number of the RAID group 40 to which the physical page 31 selected in the foregoing physical page allocation processing belongs and the physical page number of that physical page 31 in relation to the RAID group 40 and the physical page 31 that are associated with the read-target virtual page 21 in the virtual page management table 1500.

Subsequently, the read processing program 2100 updates the access counter of the virtual page 21 specified at step S2101 (S2105). Specifically, the read processing program 2100 increments by one the value stored in the access counter column 1603 corresponding to the read-target virtual page 21 in the access counter management table 1600 (FIG. 12).

Thereafter, the read processing program 2100 reads the read-target data from the physical page 31 that is allocated to the read-target virtual page 21 (S2106).

Specifically, the read processing program 2100 foremost refers to the virtual page management table 1500, and specifies the physical page (this is hereinafter referred to as the "read-target physical page") 31 allocated to the read-target virtual page 21 by acquiring the RAID group number and the physical page number corresponding to the read-target virtual page 21. Subsequently, the read processing program 2100 specifies the logical address stored in the logical address column 1403 (FIG. 10) corresponding to the read-target physical page 31 in the physical page management table 1400, and specifies the memory devices 208 configuring the corresponding RAID group 40 by referring to the RAID group management table 1100 (FIG. 7).

The read processing program 2100 refers to the RAID group management table 1100 (FIG. 7) and specifies at which address location in the memory device 208 the data of the read-target physical page 31 is being stored. Specifically, the memory device 208 storing the data of the read-target physical page 31 and the address location in that memory device 208 can be calculated based on the RAID level of the RAID group 40 to which that physical page 31 belongs, the logical address of the read-target physical page 31 that was specified as described above, the address location in the memory device 208 that was specified as described above, and the like. Since this kind of calculation method is based on well-known RAID technology, the explanation thereof is omitted. Finally, the read processing program 2100 reads the read-target data from the address location that was specified as described in the memory device 208 that was specified as described above.

Subsequently, the read processing program 2100 sends to the host 100 the read-target data that was read from the read-target physical page 31 at step S2106 (S2107), and thereafter changes the last access time stored in the last access time column 1805 corresponding to the read-target virtual page 21 in the access pattern management table 1800 (FIG. 14) to the current time. The read processing program 2100 thereafter ends this read processing.

(4-2-2) Processing of Write Processing Program

Figure 18:
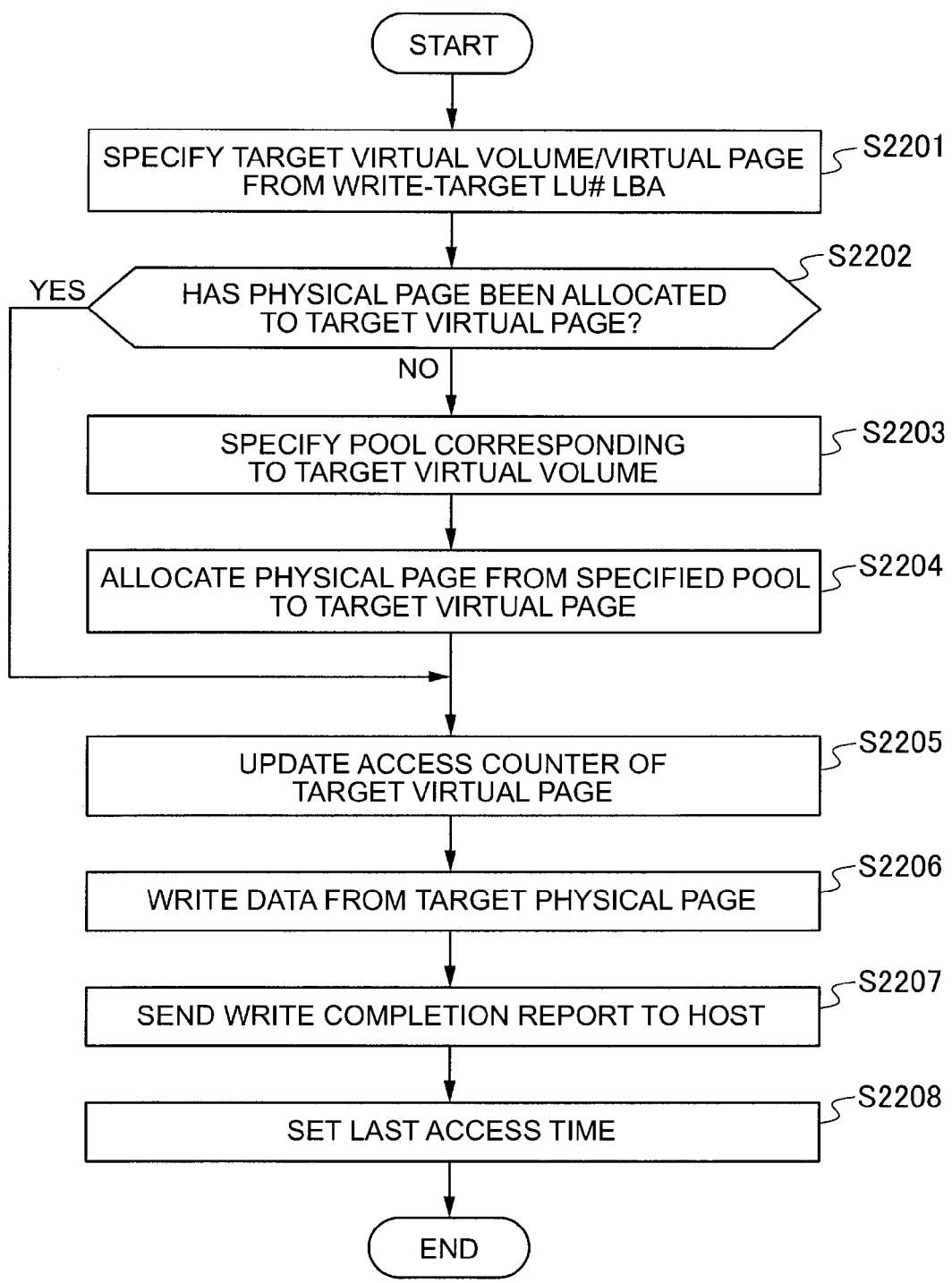
FIG. 18 is a flowchart showing the processing routine of write processing.

Meanwhile, FIG. 18 shows the processing routine of the write processing to be executed by the write processing program 2200 (FIG. 3). The write processing program 2200 stores the write-target data provided from the host in the memory device according to this write processing routine.

Specifically, the write processing program 2200 starts the write processing when it receives a write command from the host 100, and foremost specifies the logical unit number of the logical unit 10 (FIG. 2) to which the write-target data (this is hereinafter referred to as the "write-target data") designated in the write command is to be written, the volume number of the virtual volume (hereinafter referred to as the "write-target virtual volume") 20 to which the write-target data is to be written based on the block address to which the write-target data is to be written in that logical unit 10, and the virtual page number of the virtual page (this is hereinafter referred to as the "write-target virtual page") 21 to which the write-target data is to be written in that write-target virtual volume 20 (S2201). The specific method of specifying the foregoing items is the same as step S2101 of the read processing explained above with reference to FIG. 17.

Subsequently, the write processing program 2200 refers to the status column 1503 (FIG. 11) of the write-target virtual page 21 in the virtual page management table 1500 (FIG. 11), and determines whether a physical page 31 is allocated to that write-target virtual page 21 (S2202). If the write processing program 2200 obtains a positive result in the foregoing determination, it proceeds to step S2205.

Meanwhile, if the write processing program 2200 obtains a negative result in the foregoing determination, it specifies the pool 30 to be associated with the write-target virtual volume 20 as with step S2103 and step S2104 of the read processing (S2203), and allocates a physical page 31 from the specified pool 30 to the write-target virtual page 21 (S2204). In the ensuing explanation, the physical page 31 that was allocated to the write-target virtual page 21 is hereinafter referred to as the "write-target physical page 31."

Subsequently, as with step S2105 of the read processing, the write processing program 2200 increments by one the value stored in the access counter column 1603 (FIG. 12) corresponding to the write-target virtual page 21 in the access counter management table 1600 (FIG. 12) (S2205).

Next, the write processing program 2200 writes the write-target data into the write-target physical page 31 (S2206). Specifically, the write processing program 2200 specifies the write-target physical page 31 based on the method explained with reference to step S2106 of the read processing, and writes the write-target data into the specified write-target physical page 31. The redundant data in the RAID group 40 needs to be updated pursuant to the writing of the write-target data into the write-target physical page 31, but the explanation thereof is omitted.

Subsequently, the write processing program 2200 sends a write completion report to the host 100, and thereafter changes the last access time stored in the last access time column 1805 (FIG. 14) corresponding to the write-target virtual page 21 in the access pattern management table 1800 (FIG. 14) to the current time. The write processing program 2200 thereafter ends this write processing.

(4-2-3) Access Pattern Update Processing

Figure 19:
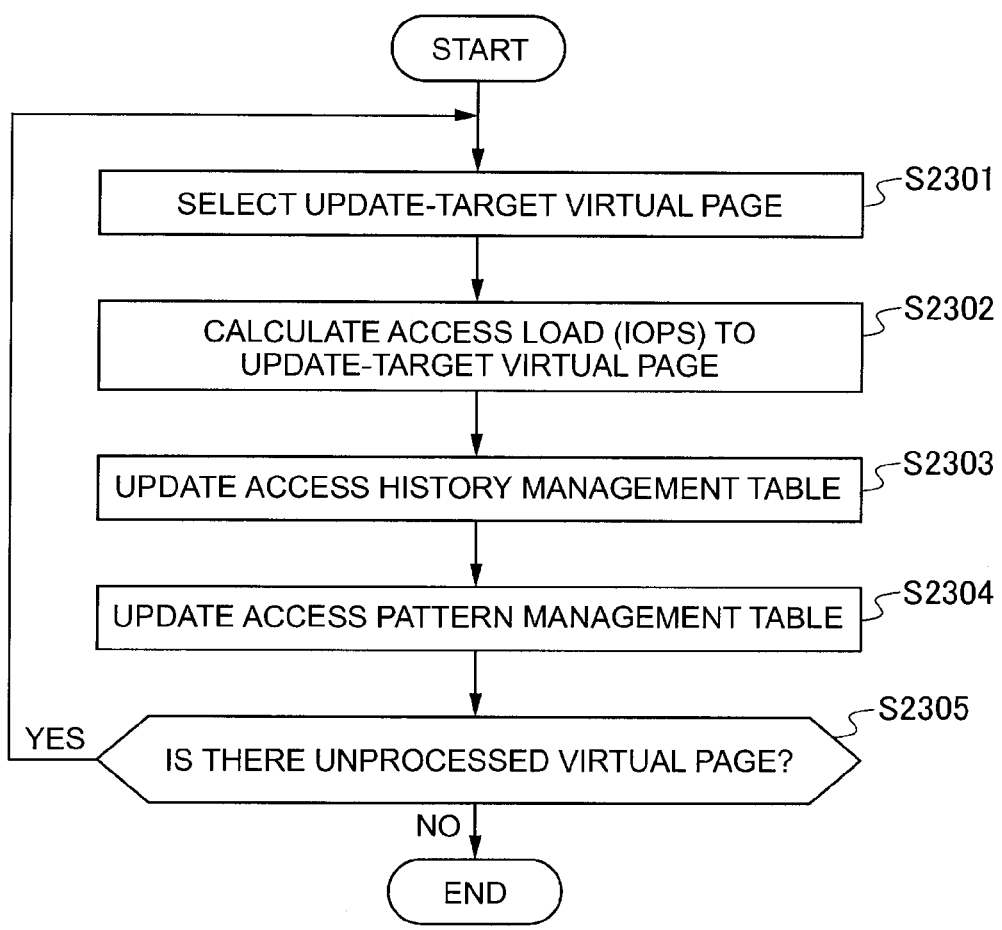
FIG. 19 is a flowchart showing the processing routine of access pattern update processing.

Meanwhile, FIG. 19 shows the processing routine of the access pattern update processing to be executed by the access pattern update processing program 2300 (FIG. 3). The access pattern update processing program 2300 updates information related to the access pattern to the virtual page 21 such as the information stored in the access pattern management table 1800 (FIG. 14) according to this access pattern update processing routine.

Specifically, the access pattern update processing program 2300 periodically starts this access pattern update processing (for instance, every 5 minutes), and foremost selects one virtual page 21 (S2301). Specifically, the access pattern update processing program 2300 selects one virtual page 21 corresponding to an entry in which the value stored in the status column 1503 (FIG. 11) is "allocated" among the entries of the virtual page management table 1500 (FIG. 11).

Subsequently, the access pattern update processing program 2300 calculates the IOPS to the virtual page (this is hereinafter referred to as the "update-target virtual page") 21 that was selected at step S2301 as the access load to that update-target virtual page 21. Specifically, the access pattern update processing program 2300 refers to the access counter column 1603 corresponding to the update-target virtual page 21 in the access counter management table 1600 (FIG. 12), and calculates the access load (IOPS) by dividing the value stored in the access counter column 1603 by the number of seconds corresponding to the foregoing prescribed period (if the prescribed period is 5 minutes, then 300 seconds). The access pattern update processing program 2300 thereafter resets the value stored in that access counter column 1603 to zero.

Subsequently, the access pattern update processing program 2300 updates the access history management table 1700 (FIG. 13) based on the calculation result at step S2402 (S2303). Specifically, the access pattern update processing program 2300 stores the access load (IOPS) calculated at step S2302 in the IOPS column 1704 (FIG. 13) corresponding to the time period (from the time that the previous access load was calculated to the time that the current access load was calculated) of the current update to be performed in the access history management table 1700.

Subsequently, the access pattern update processing program 2300 updates the access pattern management table 1800 (FIG. 14) based on the calculation result at step S2302 (S2304). Specifically, the access pattern update processing program 2300 seeks the average value of the IOPS values of a prescribed period (for instance, 1 week from 1 week ago to the current time) using the values of the access load of the IOPS column 1704 of the access history management table 1700 in which the values of the access load were stored at step S2303, and stores the sought average value in the average IOPS column 1803 (FIG. 14) of the entry corresponding to the update-target virtual page 21 in the access pattern management table 1800. Moreover, the access pattern update processing program 2300 seeks the maximum value of the IOPS values of a prescribed period (for instance, 1 week from 1 week ago to the current time) using the values stored in the IOPS column 1704 (FIG. 13) of the access history management table 1700, and stores the sought maximum value in the peak IOPS column 1804 (FIG. 14) of the entry corresponding to the update-target virtual page 21 in the access pattern management table 1800.

Subsequently, the access pattern update processing program 2300 determines whether there is a virtual page 21 in which the value stored in the corresponding status column 1503 (FIG. 11) of the virtual page management table 1500 is "allocated" (S2305). If the access pattern update processing program 2300 obtains a positive result in the foregoing determination, it returns to step S2301, and thereafter repeats the processing of step S2301 to step S2305 by sequentially switching the virtual pages 21 that are selected at step S2301 to other virtual pages 21.

When the access pattern update processing program 2300 eventually obtains a negative result at step S2305 as a result of completing the processing of step S2301 to step S2305 to all virtual pages 21 in which the value stored in the corresponding status column 1503 of the virtual page management table 1500 is "allocated," it ends this access pattern update processing.

(4-2-4) Processing of Hierarchy Control Processing Program

Figure 20:
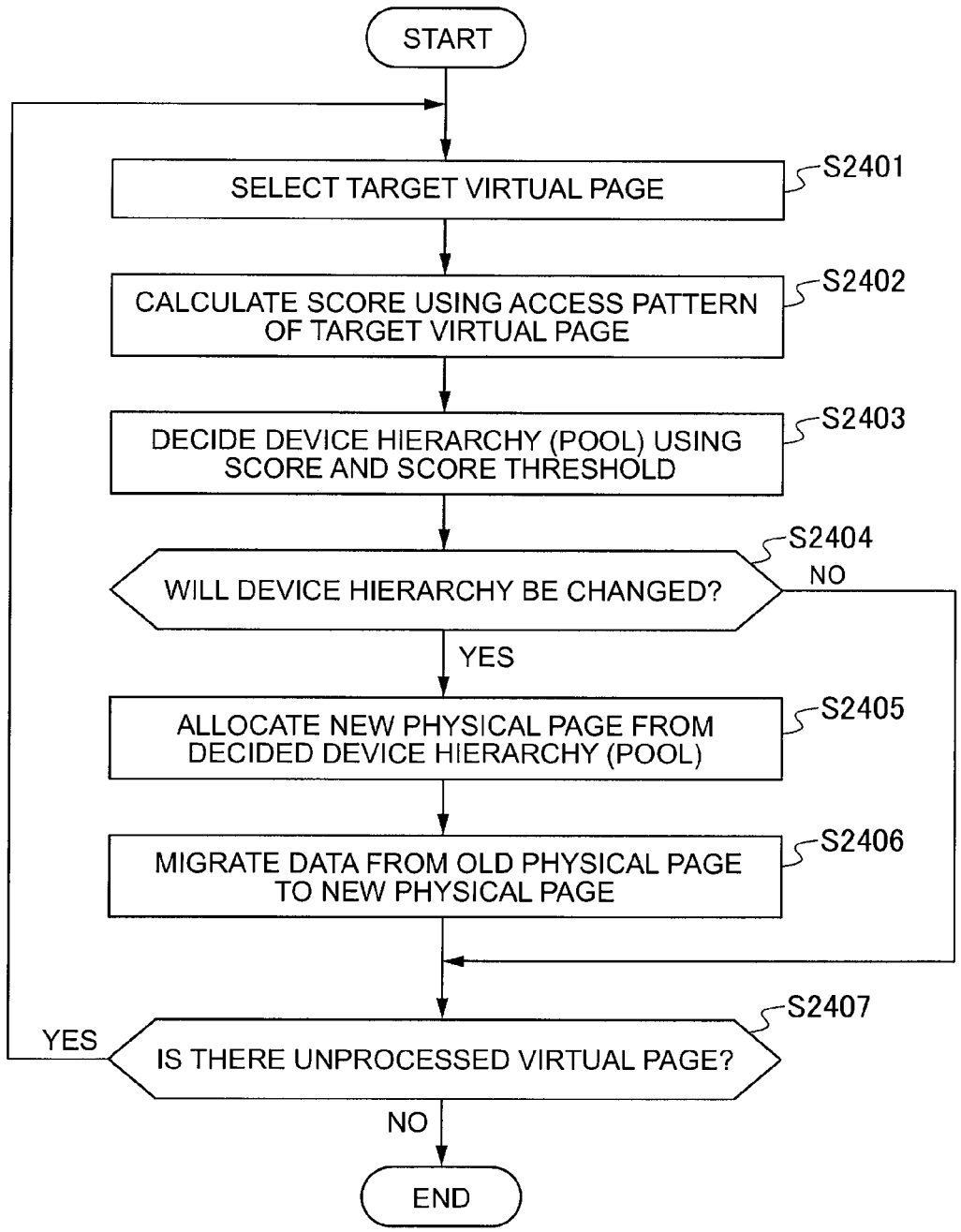
FIG. 20 is a flowchart showing the processing routine of hierarchy control processing.

Meanwhile, FIG. 20 shows the processing routine of the hierarchy control processing to be executed by the hierarchy control processing program 2400. The hierarchy control processing program 2400 migrates data stored in the physical page 31 that was allocated to a certain virtual page 21 to an appropriate physical page 31 as needed by periodically (for instance, every other day) executing this hierarchy control processing routine.

Specifically, when the hierarchy control processing program 2400 starts this hierarchy control processing, it foremost selects the virtual page to be processed (this is hereinafter referred to as the "target virtual page") 21 (S2401). Specifically, the hierarchy control processing program 2400 selects, as the target virtual page 21, one virtual page 21 in which the status stored in the status column 1503 (FIG. 11) of the virtual page management table 1500 (FIG. 11) is "allocated."

Subsequently, the hierarchy control processing program 2400 calculates the score of the processing target virtual page 21 using the access pattern of that target virtual page 21

(S2402). Specifically, the hierarchy control processing program 2400 calculates the score of the target virtual page 21 according to the following formula.

[Math. 1]

$$\begin{aligned}\text{Score of virtual page} = &\text{ "first score calculation coefficient"} \times \\ &\text{"average IOPS of target virtual page"} + \\ &\text{"second score calculation coefficient"} \times \\ &\text{"peak IOPS of target virtual page"} + \\ &\text{"third score calculation coefficient"} \times \\ &\text{"non-access period of target virtual page"}\end{aligned} \quad (1)$$

In foregoing Formula (1), the "first score calculation coefficient," the "second score calculation coefficient" and the "third score calculation coefficient" are values that are respectively stored in the columns of the same name (first score calculation coefficient column 1902, second score calculation coefficient column 1903 and third score calculation coefficient column 1904) in the hierarchy-deciding information management table 1900 (FIG. 15).

Moreover, in foregoing Formula (1), the "average IOPS of virtual page" and the "peak IOPS of virtual page" are values of the average IOPS column 1803 (FIG. 14) and the peak IOPS column 1804 (FIG. 14) corresponding to the target virtual page 21 in the access pattern management table 1800 (FIG. 14), respectively, and the "non-access period of virtual page" is the elapsed time (for example, the unit is "hours") from the last access time to the current time stored in the last access time column 1805 (FIG. 14) corresponding to the target virtual page 21 of the access pattern management table 1800.

Here, in the example illustrated in FIG. 15, since both the "first score calculation coefficient (score calculation coefficient A)" and the "second score calculation coefficient (score calculation coefficient B)" are positive values in relation to the virtual volume 20 having a volume number of "1," in foregoing Formula (1), the larger the values of the "average IOPS of virtual page" and the "peak IOPS of virtual page," the larger the score. Specifically, a virtual page 21 with a large access load will have a large score. Moreover, since the "third score calculation coefficient (score calculation coefficient C)" is of a negative value, in foregoing Formula (1), the smaller the "non-access period of virtual page," the larger the score. Specifically, a virtual page 21 that was accessed recently will have a large score, and a virtual page 21 that has not been accessed for a long period of time will contrarily have a low score.

Incidentally, although this example explained a case of calculating the score based on the linear sum of the values ("average IOPS," "peak IOPS" and "non-access period") obtained from the access pattern, the score can also be calculated based on a more complex function.

In addition, the access pattern to be used in calculating the score of the target virtual page 21 is not limited to the access load such as the "average IOPS" and "peak IOPS" or (the non-access period which is sought from) the last access time, and separate access loads may be used in the read/write access, or the number of time periods in which access was made (value of the IOPS column 1704 is greater than the value of zero) in the access history management table 1700 (FIG. 13) may also be used.

Subsequently, the hierarchy control processing program 2400 decides the device hierarchy 60 (pool 30) to which the target virtual page 21 should belong (to which data should be migrated) using the score of the target virtual page 21 calculated at step S2402 and the score threshold stored in the corresponding score threshold list column 1905 (FIG. 15) of the hierarchy-deciding information management table 1900 (FIG. 15) (S2403).

Here, the processing contents of deciding the device hierarchy 60 will differ depending on whether the number of device hierarchies stored in the corresponding device hierarchy quantity column 1304 of the device hierarchy management table 1300 (FIG. 9) is "1" or "multiple." Specifically, if the number of device hierarchies is "1," the device hierarchy 60 is not changed.

Meanwhile, if the number of device hierarchies is "multiple," the device hierarchy 60 may be changed. For example, let it be assumed that the number of device hierarchies is N (N>1). In the foregoing case, N−1 thresholds from the first threshold to the No. N−1 threshold exist as the score thresholds stored in the score threshold list column 1905 of the hierarchy-deciding information management table 1900. These score thresholds, as described above, have the relationship as shown in the following formula:

[Math. 2]

$$\text{First threshold} > \text{Second threshold} > \ldots > \text{No. } N{-}1 \text{ threshold} \quad (2)$$

The device hierarchy 60 is decided as follows:

(c-1) If "score of virtual page" is greater than or equal to "first threshold," then the device hierarchy 60 will be "Tier 1."

(c-2) If "No. K−1 threshold">"score of virtual page" and "score of virtual page" is greater than or equal to "No. K threshold" (K>1), the device hierarchy 60 will be "Tier K."

(c-3) If "No. N−1 threshold">"score of virtual page," the device hierarchy 60 will be "Tier N."

As a result of deciding the device hierarchy 60 as described above, a virtual page with a higher score (higher access load) and a shorter non-access period will be arranged in a higher (lower number) device hierarchy 60.

Subsequently, the hierarchy control processing program 2400 determines whether the device hierarchy 60 will be changed (whether data migration of the target virtual page 21 will be performed) by comparing the device hierarchy 60 to which the target virtual page 21 currently belong and the device hierarchy 60 that was decided at step S2403 (S2404).

If the hierarchy control processing program 2400 obtains a negative result in this determination, it proceeds to step S2407. Meanwhile, if the hierarchy control processing program 2400 obtains a positive result, it allocates a new physical page (new physical page) 31 from the device hierarchy 60 (pool 30) of the data migration destination that was decided at step S2403 (S2405).

Specifically, the hierarchy control processing program 2400 foremost refers to the pool management table 1200 (FIG. 8) and specifies all RAID groups 40 that are configuring the pool 30 of the data migration destination. The hierarchy control processing program 2400 also refers to the physical page management table 1400 (FIG. 10) and selects one physical page 31 in which the status is "unused" among the physical pages 31 to which that RAID group 40 belongs, and sets that physical page 31 as the new physical page 31. Incidentally, the hierarchy control processing program 2400 may also retain a table (not shown) for managing the unused physical pages 31 for each pool 30 in the control memory 202, and select the physical page 31 from such table. The hierarchy control processing program 2400 thereafter changes the status of that physical page 31 stored in the status column 1404 (FIG. 10) corresponding to the physical page 31 that was selected as described above from "unused" to "in use" in the physical page management table 1400.

Subsequently, the hierarchy control processing program 2400 performs data migration from the physical page (old physical page) 31 that is currently allocated to the target virtual page 21 to the newly allocated physical page (new physical page) 31 (S2406).

Specifically, the hierarchy control processing program 2400 once prohibits the read/write access to the target virtual page 21, and copies data of the old physical page 31 to the new physical page 31. Incidentally, the read/write access that was received during the period that the read/write access is prohibited is suspended.

Subsequently, the hierarchy control processing program 2400 associates the new physical page 31 with the target virtual page 21 by respectively setting the RAID group number of the RAID group 40 to which the new physical page 31 belongs and the physical page number of the new physical page 31 in the physical page management table 1400 in the RAID group number column 1504 and the physical page number column 1505 corresponding to the target virtual page 31 in the virtual page management table 1500 (FIG. 11). The hierarchy control processing program 2400 thereafter enables the read/write access to the target virtual page 21.

Incidentally, if the read/write access to the target virtual page 21 is not once prohibited, access to an area that has already been copied from the old physical page 31 to the new physical page 31 may be an access to the new physical page 31, and access to an area that has not been copied from the old physical page 31 to the new physical page 31 may be an access to the old physical page 31.

Subsequently, the hierarchy control processing program 2400 determines whether there is an unprocessed virtual page 21 (S2407), and returns to step S2401 upon obtaining a negative result. The hierarchy control processing program 2400 thereafter repeats the processing of step S2401 to step S2407 while sequentially switching the virtual pages 21 that were selected at step S2407 to other virtual pages 21. When the hierarchy control processing program 2400 eventually obtains a positive result at step S2407 as a result of completing the similar processing regarding all virtual pages 21 to be processed, it ends this hierarchy control processing.

(4-2-5) Processing of Backup Processing Program

Figure 21:
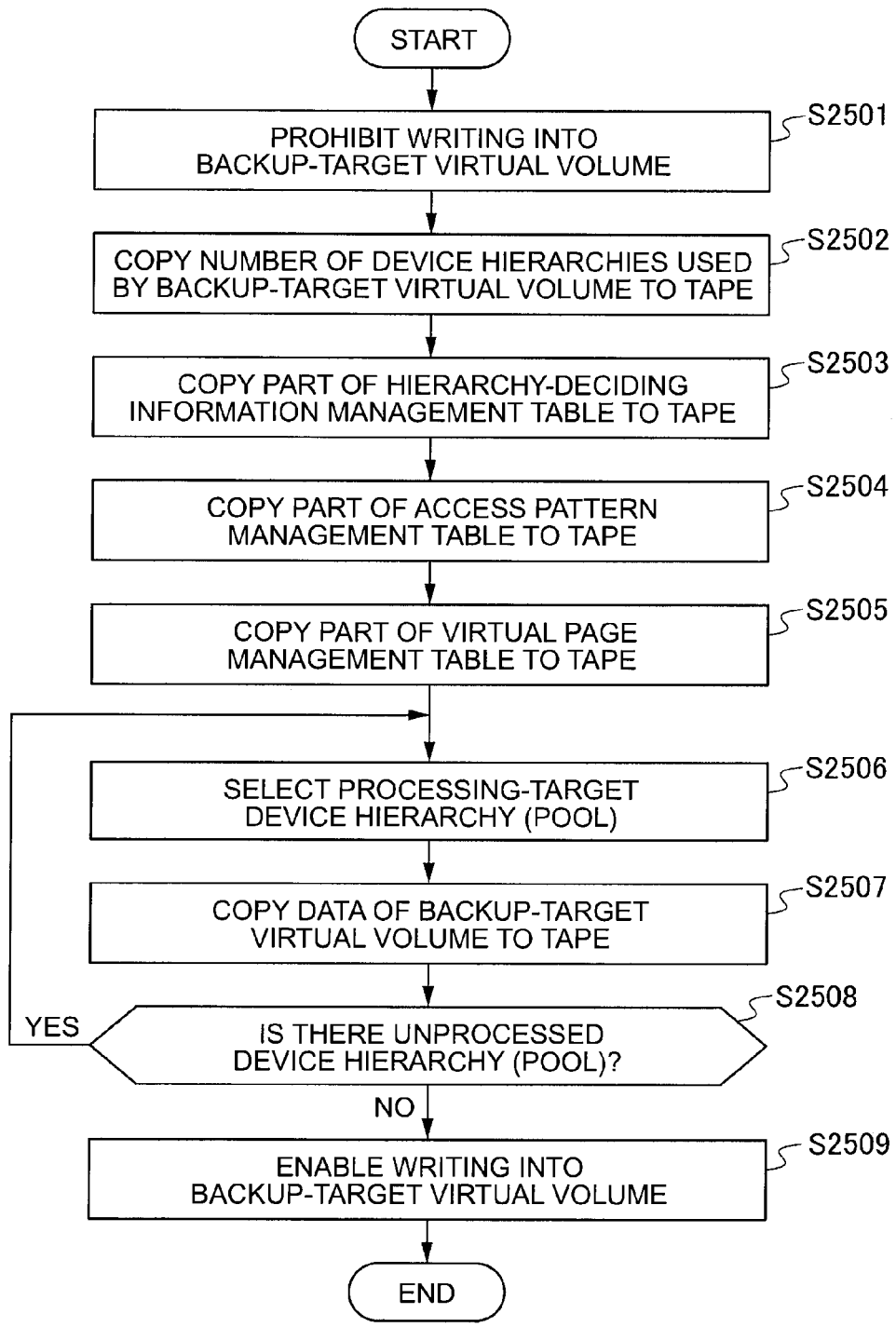
FIG. 21 is a flowchart showing the processing routine of backup processing.

FIG. 21 shows the processing contents of the backup processing to be executed by the backup processing program 2500 (FIG. 3). The backup processing program 2500 executes the backup processing upon receiving the backup start command designating the volume number of the virtual volume to be backed up (this is hereinafter referred to as the "backup-target virtual volume") 20 and the tape group number of the tape group 50 of the backup destination from the backup/restoration control command program 2800 (FIG. 5) of the management computer 400 (FIG. 1) based on a user command or a command from a scheduler (not shown).

Specifically, when the backup processing program 2500 starts this backup processing, it foremost prohibits the writing of data into the backup-target virtual volume 20 designated in the backup start command (S2501).

Subsequently, the backup processing program 2500 copies the number of device hierarchies (device hierarchy quantity) that is being used by the backup-target virtual volume 20 to the tape group 50 of the backup destination. Specifically, the backup processing program 2500 copies the number of device hierarchies stored in the device hierarchy quantity column 1304 corresponding to the backup-target virtual volume 20 in the device hierarchy management table 1300 (FIG. 9) to the tape group 50 of the backup destination.

Subsequently, the backup processing program 2500 copies the information of the entry (corresponding row in FIG. 15) corresponding to the backup-target virtual volume 20 in the hierarchy-deciding information management table 1900 (FIG. 15) to the tape group 50 of the backup destination (S2503), and thereafter copies all information of the entries (corresponding rows in FIG. 14) corresponding to the respective virtual pages 21 included in the backup-target virtual volume 20 of the access pattern management table 1800 (FIG. 14) to the tape group 50 of the backup destination.

Subsequently, the backup processing program 2500 copies the information of the entries (corresponding rows in FIG. 14) corresponding to the respective virtual pages 21 included in the backup-target virtual volume 20 of the virtual page management table 1500 (FIG. 11) to the tape group 50 of the backup destination. Since certain entries of the virtual page management table 1500; specifically, the RAID group number stored in the RAID group number column 1504 and the physical page number stored in the physical page number column 1505 cannot be used during the restoration processing, they may be excluded from the copy target.

The backup processing program 2500 further selects one device hierarchy 60 among all device hierarchies 60 that are being used by the backup-target virtual volume 20 (S2506). Specifically, the backup processing program 2500 sets, as N, the number of device hierarchies stored in the device hierarchy quantity column 1304 (FIG. 9) corresponding to the backup-target virtual volume 20 of the device hierarchy management table 1300 (FIG. 9), and selects one device hierarchy 60 in order from the highest device hierarchy to the lowest device hierarchy 60 ("Tier 1" to "Tier N") among the device hierarchies 60 included in the backup-target virtual volume 20 of the device hierarchy management table 1300.

Subsequently, the backup processing program 2500 copies the data included in the device hierarchy 60 selected at step S2506 among the data stored in the backup-target virtual volume 20 from the corresponding physical page 31 to the tape 303 (S2507).

Specifically, the backup processing program 2500 foremost specifies the respective RAID group numbers of all RAID groups 40 included in the pool 40 that is associated with the device hierarchy 60 to be processed from the pool management table 1200 (FIG. 8). Subsequently, the backup processing program 2500 selects one RAID group number among all of the RAID groups numbers that were specified, and copies, to the tape 303, the data of the physical page 31 allocated to the virtual page 21 in which the status stored in the status column 1503 (FIG. 11) is "allocated" and the RAID group number stored RAID group number column 1504 (FIG. 11) coincides with the selected RAID group number among the virtual pages 21 included in the backup-target virtual volume 20 of the virtual page management table 1500. The same processing is performed to all specified RAID group numbers. As a result of performing the copy for each RAID group 40, the possibility of being able to simultaneously access the areas in close proximity in the memory devices 208 will increase, whereby the improvement in the backup performance can be expected.

Subsequently, the backup processing program 2500 determines whether there is an unprocessed device hierarchy 60 among the device hierarchies 60 that are associated with the backup-target virtual volume 20 (S2508). If the backup processing program 2500 obtains a positive result in the foregoing determination, it returns to step S2506, and thereafter repeats the same processing until it receives a negative result at step S2508.

When the backup processing program 2500 eventually obtains a negative result at step S2508 as a result of completing the same processing regarding all device hierarchies 60, it enables the write of data into the backup-target virtual volume 20 (S2509), and thereafter ends this backup processing.

(4-2-6) Processing of Restoration Processing Program

Figure 22:
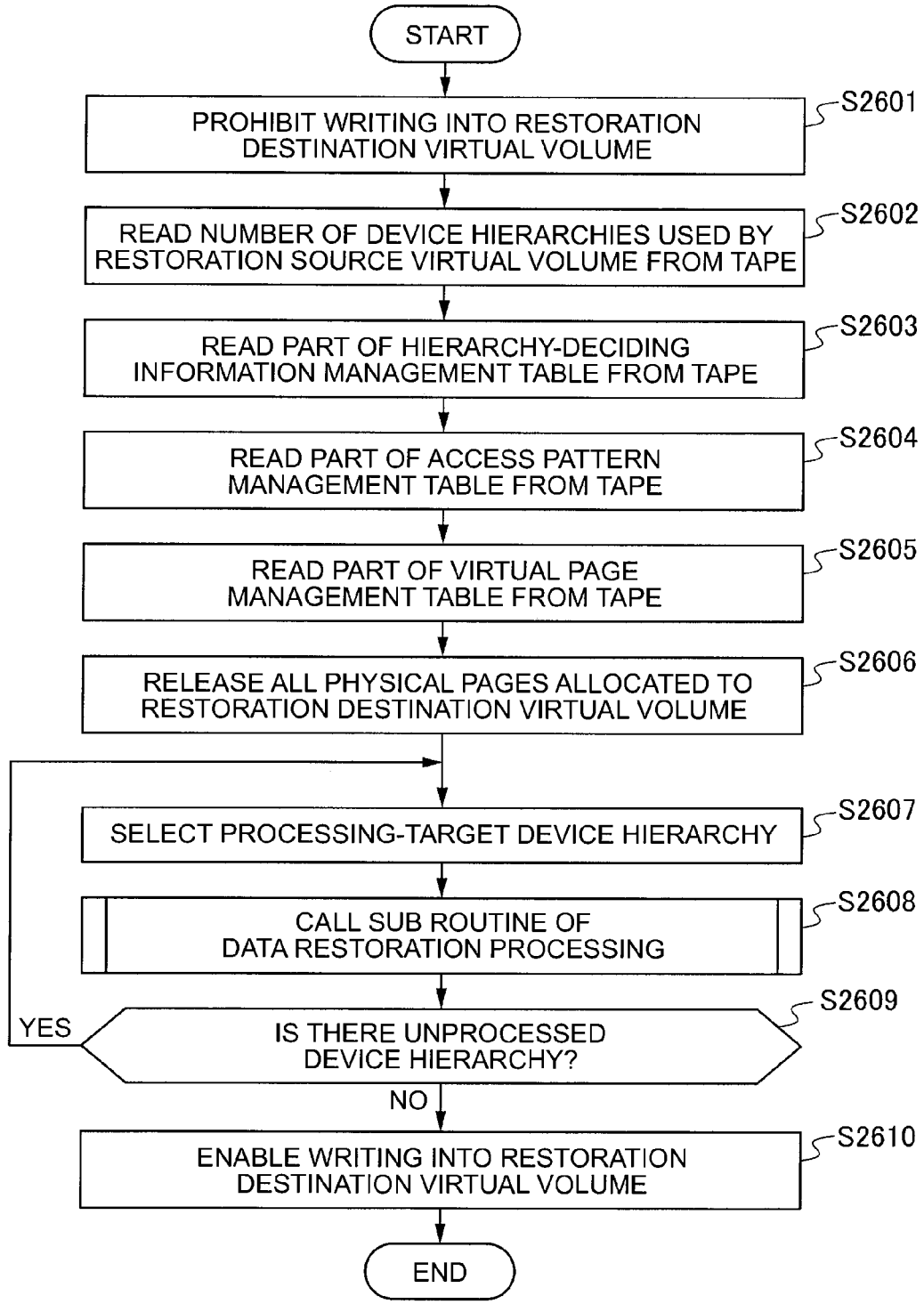
FIG. 22 is a flowchart showing the processing routine of restoration processing.

Meanwhile, FIG. 22 shows the processing contents of the restoration processing to be executed by the restoration processing program 2600 (FIG. 3). The restoration processing program 2600 executes this restoration processing upon receiving a restoration start command designating the tape group (this is hereinafter referred to as the "restoration-source tape group") 50 of the restoration source, the volume number of the virtual volume 20 to be restored (this is hereinafter referred to as the "restoration-target virtual volume"), and the volume number of the virtual volume 20 of the restoration destination (this is hereinafter referred to as the "restoration-destination virtual volume") from the backup/list control command program 2800 (FIG. 5) of the management computer 400 (FIG. 1) based on a user command or a command from a scheduler (not shown).

Specifically, when the restoration processing program 2600 starts this restoration processing, it foremost prohibits the writing of data into the restoration-destination virtual volume 20 that is designated in the restoration start command (S2601).

Subsequently, the restoration processing program 2600 reads the number of device hierarchy 60 (device hierarchy count) that were being used by the restoration-target virtual volume 20 before being backed up from the restoration-source tape group 50 designated in the restoration start command, and stores the read number of device hierarchies in a temporary storage area of the control memory 202 (FIG. 1) (S2602). The foregoing number of device hierarchies was copied to the restoration-source tape group 50 at step S2502 of the backup processing that was explained above with reference to FIG. 12.

Subsequently, the restoration processing program 2600 reads, from the restoration-source tape group 50, the information of the hierarchy-deciding information management table 1900 (FIG. 15) that was copied to that restoration-source tape group 50 at step S2503 of the backup processing (FIG. 21), and stores this in a temporary storage area of the control memory 202 (S2603).

Further, the restoration processing program 2600 reads, from the restoration-source tape group 50, the information of the access pattern management table 1800 (FIG. 14) that was copied to that restoration-source tape group 50 at step S2504 of the backup processing (FIG. 21), and stores this in a temporary storage area of the control memory 202 (S2604).

Moreover, the restoration processing program 2600 reads, from the restoration-source tape group 50, the information of the virtual page management table 1500 (FIG. 11) that was copied to that restoration-source tape group 50 at step S2505 of the backup processing (FIG. 21), and stores this in a temporary storage area of the control memory 202 (S2605).

Subsequently, the restoration processing program 2600 releases all physical pages 31 that were allocated to the restoration-destination virtual volume 20 (S2606). Specifically, the restoration processing program 2600 changes, with regard to all virtual pages 21 in which the status stored in the corresponding status column 1503 (FIG. 11) of the virtual page management table 1500 was "allocated" among the virtual pages 21 included in the restoration-destination virtual volume 20, the respective statuses to "unallocated," and further changes the values of the RAID group number stored in the RAID group number column 1504, the physical page number stored in the physical page number column 1505, and the device hierarchy 60 stored in the device hierarchy column 1506 to "NULL," respectively. The restoration processing program 2600 additionally changes, with regard to the physical pages 31 that were allocated to the virtual pages 21 in which the status stored in the status column 1503 of the virtual page management table 1500 was "allocated," the status stored in the corresponding status column 1404 of the physical page management table 1400 (FIG. 10) to "unused."

Subsequently, the restoration processing program 2600 selects a device hierarchy 60 to be processed among the one or more device hierarchies 60 that were being used by the restoration-source virtual volume 20. Specifically, assuming that the number of device hierarchies that was read from the restoration-source tape group 50 at step S2602 is N, one device hierarchy 60 is selected in order from "Tier 1" as the highest device hierarchy 60 to "Tier N" as the lowest device hierarchy 60.

Thereafter, the restoration processing program 2600 decides the physical pages 31 to be respectively allocated to the respective virtual pages 21 storing the data of the restoration-target virtual volume 20 regarding the device hierarchy 60 that was selected at step S2607, and copies the data of the corresponding virtual pages 21 from the restoration-source tape group 50 to the decided physical pages 31, respectively (S2608).

Subsequently, the restoration processing program 2600 determines whether there is an unprocessed device hierarchy 60 (S2609), and returns to step S2607 upon obtaining a negative result. The restoration processing program 2600 thereafter repeats the same processing until it obtains a negative result at step S2609 while sequentially switching the device hierarchies 60 that were selected at step S2609 to other device hierarchies 60.

When the restoration processing program 2600 eventually obtains a negative result at step S2609 as a result of completing the processing at step S2608 to all device hierarchies, it enables the writing of data into the restoration-destination virtual volume 20, and thereafter ends this restoration processing.

Figure 23:
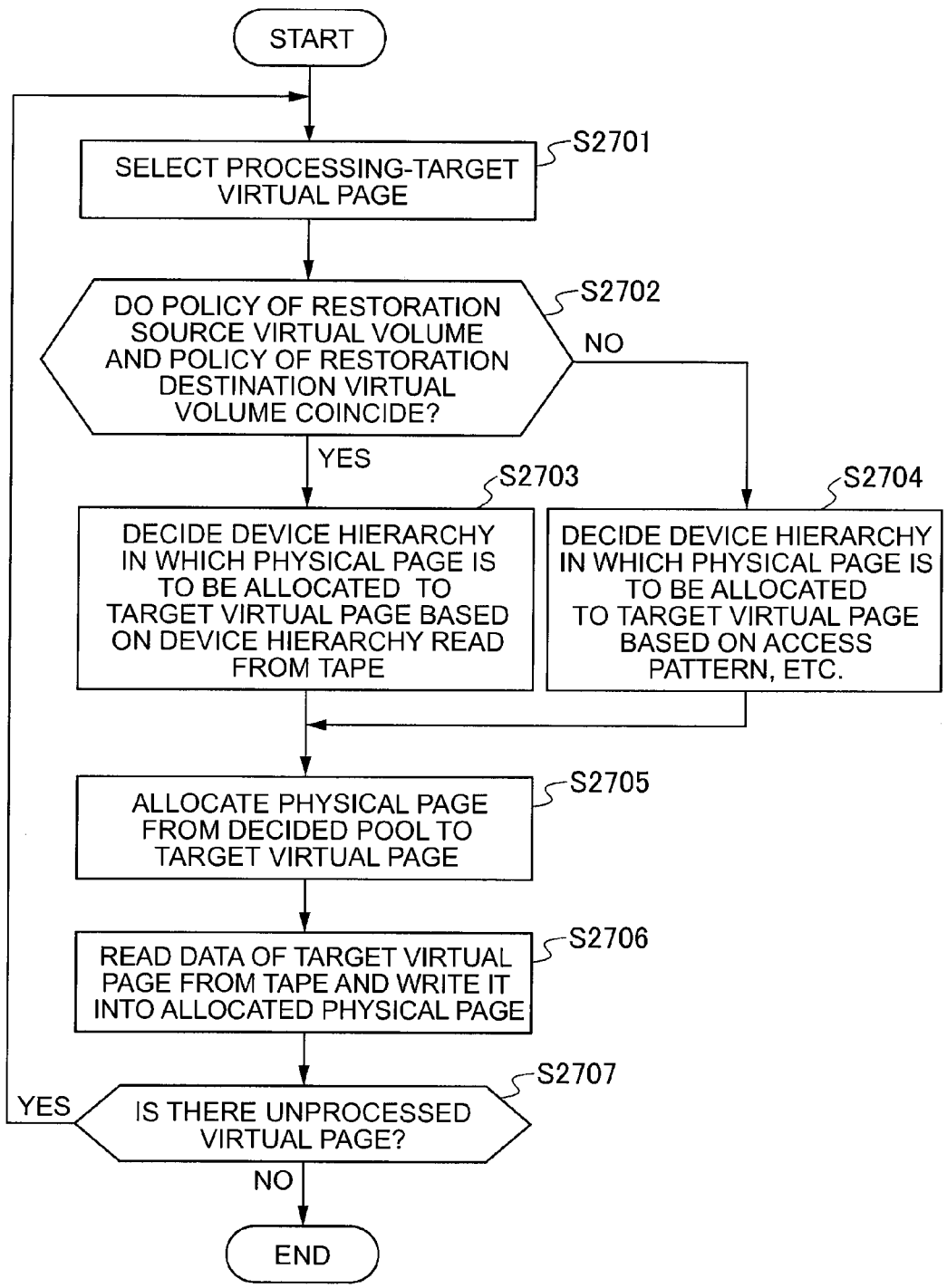
FIG. 23 is a flowchart showing the processing routine of data restoration processing.

The specific processing contents of the data copy processing to be executed at step S2609 of the foregoing restoration processing are shown in FIG. 23.

When the restoration processing program 2600 proceeds to step S2609 of the restoration processing, it starts this data restoration processing, and foremost selects one virtual page 21 among the virtual pages 21 in the virtual volume 20 associated with the device hierarchy 60 that was selected at step S2607 of the restoration processing among the virtual pages 21 belonging to the restoration-target virtual volume 20 (S2701). Specifically, the restoration processing program 2600 selects one virtual page 21, in ascending order of the virtual page number, in which the status is "allocated" based on the information of the virtual page management table 1500 that was stored in the temporary area of the control memory 202 at step S2605 of the restoration processing.

Subsequently, the restoration processing program 2600 determines whether the policy of the virtual volume 20 to which the restoration-source virtual page 21 belongs and the policy of the virtual volume 20 to which the restoration-destination virtual page 21 belongs coincide regarding the virtual pages 21 that were selected at step S2701 (S2702). Specifically, the restoration processing program 2600 determines that the policies coincide only when the number of device hierarchies 60 (device hierarchy count) to be used by the restoration-source virtual volume 20 that was stored in the temporary area of the control memory 202 at step S2603 of the restoration processing and the number of device hierarchies of the restoration-destination virtual volume 20 stored in the corresponding device hierarchy quantity column 1304 of the device hierarchy management table 1300 (FIG. 9) coincide, and the values of the corresponding entries (first to third score calculation coefficients respectively stored in the first to third score calculation coefficient columns 1902 to 1904, and score thresholds stored in the score threshold list column 1905) in the hierarchy-deciding information management table 1900 (FIG. 15) stored in the temporary storage area of the control memory 202 at step S2604 and the respective entries (same as above) corresponding to the restoration-destination virtual volume 20 in the hierarchy-deciding information management table 1900 coincide, and determines that the policies do not coincide in all other cases.

If the restoration processing program 2600 obtains a positive result in the foregoing determination, it decides the device hierarchy 60 (pool 30) to which the physical page 31 corresponding to the restoration-target virtual page 21 is to be allocated based on the device hierarchy 60 corresponding to the restoration-target virtual page 21 that was read from the tape 303. Specifically, the value of the device hierarchy 60 (value stored in the corresponding device hierarchy column 1506 of the virtual page management table 1500) of the restoration-target virtual page 21 in a part of the replication of the virtual page management table 1500 that was stored in the temporary area of the control memory 202 at step S2606 of the restoration processing (FIG. 22) is used as the device hierarchy 60 to which the physical page 31 of restoration-target virtual page 21 is to be allocated.

Meanwhile, if the restoration processing program 2600 obtains a negative result in the determination at step S2702, it determines the device hierarchy 60 (pool 30) to which the physical page 31 in relation to the restoration-target virtual page 21 is to be allocated based on the access pattern to the virtual page 21 in the restoration-source virtual volume 20 that was read from the tape 303, and the hierarchy-deciding information of the restoration-destination virtual volume 20 (S2704).

Specifically, the restoration processing program 2600 foremost calculates the score of the restoration-target virtual page 21, based on the same method as step S2404 of the hierarchy control processing explained above with reference to FIG. 20, by using the access pattern to the restoration-target virtual page 21 of the restoration-source virtual volume 20 (values of the corresponding average IOPS column 1803, peak IOPS column 1804 and last access time column 1805 in the access pattern management table 1800) and the values of the first to third score calculation coefficients of the restoration-destination virtual volume 20 in the hierarchy-deciding information management table 1900 (FIG. 15) (values stored in the first to third score calculation coefficient columns 1902 to 1904 of the hierarchy-deciding information management table 1900) in a part of the replication of the access pattern management table 1800 (FIG. 14) that was stored in the temporary storage area of the control memory 202 at step S2604 of the restoration processing (FIG. 22).

Subsequently, the restoration processing program 2600 decides the device hierarchy 60 (pool 30) to which the restoration-target virtual page 21 should belong, based on the same method as step S2403 of the hierarchy control processing (FIG. 20), by using the score of the restoration-target virtual page 21 that was calculated as described above, and the score thresholds stored in the score threshold list column 1905 corresponding to the restoration-destination virtual volume 20 in the hierarchy-deciding information management table 1900. Here, the decided device hierarchy 60 (pool 30) is the device hierarchy 60 (pool 30) to which the physical page 31 of the restoration-target virtual page 21 is to be allocated.

If at step S2603 of the restoration processing (FIG. 22) the number of device hierarchies stored in the temporary area of the control memory 202 (number of device hierarchies 60 to be used by the restoration-source virtual volume 20) and the number of device hierarchies stored in the device hierarchy quantity column 1304 corresponding to the restoration-destination virtual volume 20 in the device hierarchy management table 1300 coincide, according to a user command, the respective entries (first to third score calculation coefficients and score thresholds) of a part of the replication of the hierarchy-deciding information management table 1900 (including the hierarchy-deciding information concerning the restoration-source virtual volume 20) that were stored in the temporary area of the control memory 202 at step S2604 may be copied to the respective entries (same as above) of the restoration-destination virtual volume 20 in the hierarchy-deciding information management table 1900, and the processing of step S2704 may be thereafter performed. Consequently, the hierarchy-deciding information of the restoration-source virtual volume 20 will be succeeded by the restoration-destination virtual volume 20, and it will be possible to perform hierarchy control to the restoration-destination virtual volume 20 in the same manner as performing hierarchy control with the backup-source storage apparatus 200 of the restoration-source virtual volume 20.

Moreover, according to a user command, the access pattern to the virtual pages 21 in the restoration-source virtual volume 20 may be succeeded as the access pattern of the virtual pages 21 in the restoration-destination virtual volume 20 after step S2704 of the data restoration processing (FIG. 23). Specifically, a part of the replication of the access pattern management table 1800 (including information of the access pattern concerning all virtual pages in the restoration-source virtual volume) that was stored in the temporary area of the control memory 202 at step S2605 of the restoration processing is copied to the corresponding row in the access pattern management table 1800. Consequently, the restoration-destination storage apparatus 200 will no longer need to learn the access pattern to the virtual pages 21 in the restoration-destination virtual volume 20 from the very beginning (from a state where no access pattern is recorded).

Moreover, in substitute for the method of deciding the device hierarchy 60 (pool 30) of this example shown in step S2701 to S2703 of the data restoration processing (FIG. 23), a user-designated device hierarchy 60 may also be used. Consequently, for instance, the restoration time can be shortened by performing restoration by using only the device hierarchy 60 with the highest performance.

Subsequently, the restoration processing program 2600 allocates a physical page 31 to the restoration-target virtual page 21 from the pool 30 corresponding to the device hierarchy 60 that was decided at step S2703 or step S2704 (S2705). The specific method is the same as step S2105 of the read processing that was explained above with reference to FIG. 17.

Subsequently, the restoration processing program 2600 reads the data of the restoration-target virtual page 21 from the tape 303, and writes the data into the allocated physical page 31 according to the same method as step S2207 of the write processing that was explained above with reference to FIG. 18 (S2706).

Further, the restoration processing program 2600 determines whether there is an unprocessed virtual page 21, and returns to step S2701 upon obtaining a positive result. Subsequently, the restoration processing program 2600 repeats the same processing while sequentially switching the restoration-target virtual pages 21 that are selected at step S2701 to other virtual pages 21. When the restoration processing program 2700 eventually obtains a negative result at step S2707 as a result of completing the same processing regarding all restoration-target virtual pages 21 belonging to the target device hierarchy 60, it ends this data restoration processing and returns to the restoration processing.

(5) Effect of Present Embodiment

With the computer system 1 of the present embodiment, in addition to backing up data stored in the respective physical pages 30 allocated to the virtual volume 20 in response to a backup command of the virtual volume 20, management information such as the number of device hierarchies 60 to be used by that virtual volume 20, the first to third score calculation coefficients and score thresholds, the access pattern from the host 100 for each virtual page 21, and the device hierarchy 60 for each virtual page 21 is backed up to the tape 303 on the one hand, and, when a restoration command of that virtual volume 20 is issued, data is restored upon allocating a physical page 31 from the pool 30 of the device hierarchy 60 which is the same as the device hierarchy 60 that was allocated to the respective virtual pages 21 before the backup of the virtual volume 20 based on the foregoing management information that was backed up to the tape 303. Thus, it is possible to restore the data to the appropriate device hierarchy 60 according to its data value. Consequently, it is possible to realize a computer system that is able to efficiently use the storage areas in the storage apparatus 200.

(6) Other Embodiments

Although the foregoing embodiment explained a case of applying the tape 303 (sequential access-type memory device) as the backup destination of the virtual volume 20, the present invention is not limited thereto, and a random access-type memory device such as a hard disk drive may also be applied as the backup destination.

Moreover, although the foregoing embodiment explained a case of applying the present invention to the storage apparatus 200 as configured in FIG. 1 and FIG. 2, the present invention is not limited thereto, and may also be broadly applied to storage apparatuses of various configurations.

In addition, although the foregoing embodiment explained a case of backing up, in addition to the target data to be backed up during the backup process, management information such as the number of device hierarchies 60 to be used by that virtual volume 20, the first to third score calculation coefficients and score thresholds, the access pattern from the host 100 for each virtual page 21, and the device hierarchy 60 for each virtual page 21 to the tape 303, the present invention is not limited thereto, and, so as long as at least information concerning the device hierarchy 60 to which the respective physical pages 31 allocated to the respective virtual pages 21 belong is backed up, it is possible to restore the data to the appropriate device hierarchy 60 according to its data value.

INDUSTRIAL APPLICABILITY

The present invention can be applied to a storage apparatus equipped with a function of rearranging data stored in a virtual volume and a function of backing up the virtual volume.

The invention claimed is:
1. A storage apparatus configured to
provide a virtual volume to a host;
allocate a storage area comprising a plurality of device hierarchies to the virtual volume in prescribed physical page units according to a data write request from the host for writing data into the virtual volume; and
write write-target data into a first physical page of a first device hierarchy in the storage area,
the storage apparatus comprising:
an access pattern management unit configured to manage an access pattern from the host to the virtual volume for each virtual page of the virtual volume corresponding to the first physical page, wherein the access pattern of a virtual page comprises information concerning an average access count per second, a maximum value of the average access count, and a non-access period for the virtual page;
a hierarchy control processing unit configured to change the first physical page to a second physical page belonging to another device hierarchy in the storage area for each of the virtual pages of the virtual volume based on the access pattern and as necessary, and migrate data stored in a pre-change physical page to a post-change physical page;
a backup processing unit configured to store, in a backup-destination storage medium, data stored in the respective physical pages allocated with the virtual volume and management information of the virtual volume including information concerning the device hierarchy to which the respective physical pages belong according to a backup command of the virtual volume; and
a restoration processing unit configured to allocate another physical page of the first device hierarchy to each restoration-target virtual pages of the virtual volume, respectively, and write corresponding data, which was read from the storage medium, into each of the allocated another physical pages according to a restoration command of the virtual volume and based on the management information of the virtual volume stored in the storage medium.

2. The storage apparatus according to claim 1, further comprising:
one or more memory devices for providing the storage area; and
a controller configured to read data from and write data into the one or more memory devices,
wherein the controller comprises:
a CPU (Central Processing Unit) configured to govern the operational control of the overall storage apparatus; and
a control memory storing an access pattern update management program, a hierarchy control processing program, a backup processing program and a restoration processing program, and an access pattern management table having registered therein an average access count per second, a maximum value of the average access count, and a last access time for each virtual page of the virtual volume,
wherein the access pattern management unit is configured from the access pattern update management program stored in the memory and the CPU that executes the access pattern update management program, and is configured to manage at least information concerning an average access count per second, a maximum value of the average access count, and a non-access period for each virtual page of the virtual volume as the access pattern from the host to the virtual volume by periodically updating the access pattern management table, wherein the hierarchy control processing unit is configured from the hierarchy control processing program stored in the memory and the CPU that executes the hierarchy control processing program, wherein the backup processing unit is configured from the backup processing program stored in the memory and the CPU that executes the backup processing program, wherein the restoration processing unit is configured from the restoration processing program stored in the memory and the CPU that executes the restoration processing program, wherein the backup processing unit is configured to back up data and management information of the virtual volume for each of the device hierarchies used by the backup-target virtual volume, wherein the hierarchy controller is configured to
retain coefficients respectively associated with the average access count per second, the maximum value of the average access count and the non-access period predetermined for each of the virtual volumes and one or more score thresholds prescribing a score range for each device hierarchy as hierarchy-deciding information;

calculate a score for each virtual page of the virtual volume by respectively multiplying the average access count per second, the maximum value of the average access count, and the non-access period included in the access pattern of the virtual volume by the corresponding coefficients included in the hierarchy-deciding information; and determine whether to change the physical page allocated with the virtual page to a physical page belonging to another device hierarchy by comparing the calculated score and the score threshold, and to which physical page belonging to which device hierarchy the change should be made, wherein the management information of the virtual volume to be backed up to the storage medium includes the hierarchy-deciding information of the virtual volume, device hierarchy information representing the device hierarchy to which the physical page belongs for each virtual page allocated with a physical page, and the access pattern for each virtual page allocated with a physical page, wherein the restoration processing unit is configured to decide the device hierarchy to which the respective physical pages to be allocated to the respective virtual pages of the restoration-destination virtual volume belong based on the corresponding device hierarchy information stored in the storage medium when the number of device hierarchies used by the restoration-target virtual volume and the hierarchy-deciding information coincide with the number of device hierarchies of the restoration-destination virtual volume and the hierarchy-deciding information, and wherein the restoration processing unit is configured to decide the device hierarchy to which the respective physical pages to be allocated to the respective virtual pages of the restoration-destination virtual volume belong based on the corresponding access pattern and the corresponding hierarchy-deciding information stored in the storage medium when the number of device hierarchies used by the restoration-target virtual volume and the hierarchy-deciding information do not coincide with the number of device hierarchies of the restoration-destination virtual volume and the hierarchy-deciding information.

3. The storage apparatus according to claim 1,
wherein the backup processing unit is configured to back up data and management information of the virtual volume for each of the device hierarchies used by the backup-target virtual volume.

4. The storage apparatus according to claim 1,
wherein the hierarchy controller is configured to retain hierarchy-deciding information including one or more predetermined coefficients for each of the virtual volumes, calculate a score for each virtual page of the virtual volume based on the access pattern and the corresponding hierarchy-deciding information, and determine whether to change the physical page allocated with the virtual page to a physical page belonging to another device hierarchy based on the calculated score, and to which physical page belonging to which device hierarchy the change should be made.

5. The storage apparatus according to claim 4,
wherein the access pattern includes information concerning an average access count per second, a maximum value of the average access count, and a non-access period for each virtual page of the virtual volume, wherein the hierarchy-deciding information includes coefficients respectively associated with the average access count per second, the maximum value of the average access count, and the non-access period, and wherein the hierarchy controller is configured to calculate a score for each virtual page by respectively multiplying the average access count per second, the maximum value of the average access count, and the non-access period included in the access pattern of the virtual volume by the corresponding coefficients included in the hierarchy-deciding information.

6. The storage apparatus according to claim 5,
wherein the hierarchy-deciding information includes one or more score thresholds prescribing a score range for each device hierarchy, and wherein the hierarchy controller is configured to determine, by comparing the calculated score and the score threshold for each virtual page of the virtual volume, whether to change the physical page allocated with the virtual page to a physical page belonging to another device hierarchy based on the calculated score, and to which physical page belonging to which device hierarchy the change should be made.

7. The storage apparatus according to claim 6,
wherein the management information of the virtual volume to be backed up to the storage medium includes the hierarchy-deciding information of the virtual volume, and device hierarchy information representing the device hierarchy to which the physical page belongs for each virtual page allocated with a physical page, and wherein the restoration processing unit is configured to decide the device hierarchy to which the respective physical pages to be allocated to the respective virtual pages of the restoration-destination virtual volume belong based on the corresponding device hierarchy information stored in the storage medium when the number of device hierarchies used by the restoration-target virtual volume and the hierarchy-deciding information coincide with the number of device hierarchies of the restoration-destination virtual volume and the hierarchy-deciding information.

8. The storage apparatus according to claim 6,
wherein the management information of the virtual volume to be backed up to the storage medium includes hierarchy-deciding information of the virtual volume, and the access pattern for each virtual page allocated with a physical page,
wherein the restoration processing unit is configured to decide the device hierarchy to which the respective physical pages to be allocated to the respective virtual pages of the restoration-destination virtual volume belong based on the corresponding access pattern and the corresponding hierarchy-deciding information stored in the storage medium when the number of device hierarchies used by the restoration-target virtual volume and the hierarchy-deciding information do not coincide with the number of device hierarchies of the restoration-destination virtual volume and the hierarchy-deciding information.

* * * * *